US011223989B2

(12) United States Patent
Teboulle et al.

(10) Patent No.: US 11,223,989 B2
(45) Date of Patent: Jan. 11, 2022

(54) METHOD FOR MANAGING HANDOVER ROAMING

(71) Applicant: SAGEMCOM ENERGY & TELECOM SAS, Rueil Malmaison (FR)

(72) Inventors: Henri Teboulle, Rueil Malmaison (FR); Guillaume Moreau, Rueil Malmaison (FR); Franck Harnay, Rueil Malmaison (FR); Marc Le Gourrierec, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 172 days.

(21) Appl. No.: 16/568,862

(22) Filed: Sep. 12, 2019

(65) Prior Publication Data
US 2020/0100157 A1 Mar. 26, 2020

(30) Foreign Application Priority Data

Sep. 25, 2018 (FR) ...................................... 18/71087

(51) Int. Cl.
*H04W 36/14* (2009.01)
*H04L 29/12* (2006.01)
(Continued)

(52) U.S. Cl.
CPC .......... *H04W 36/14* (2013.01); *H04L 9/0819* (2013.01); *H04L 61/10* (2013.01); *H04W 36/023* (2013.01); *H04W 12/06* (2013.01); *H04W 88/16* (2013.01)

(58) Field of Classification Search
None
See application file for complete search history.

(56) References Cited

U.S. PATENT DOCUMENTS

2008/0129494 A1 6/2008 Kim et al.
2018/0124590 A1* 5/2018 O'Connell .............. H04W 8/12
(Continued)

OTHER PUBLICATIONS

Nguyen Than-Long et al; "Horizontal Integration of CoAP and MQTT on Internet Protocol—based LoRaMotes;" 2018 IEEE 29th Annual International Symposium on Personal, Indoor and Mobile Radio Communications (PIMRC); IEEE; Sep. 9, 2018; pp. 1-7; XP033479317.

(Continued)

*Primary Examiner* — Marcus Smith
(74) *Attorney, Agent, or Firm* — Oliff PLC; R. Brian Drozd

(57) ABSTRACT

A communication system comprises a first LPWAN network of a first operator and a second LPWAN network of a second operator. The first network comprises subnetworks implementing separate respective transport protocols. The subnetworks comprise at least one convergence node and communication nodes integrating gathering gateways. The first network comprises servers interconnected to a server of the second network interfacing an application server and an authentication server. Uplink frames of application data are transported from an end device of the second operator to the application server by successive relayings of the servers. However, when the end device of the second operator requests to join the communication system in order to benefit from the services of the application server, the gathering gateways communicate directly with the authentication server by shortcutting the other servers as well as the convergence nodes to which said gathering gateways are respectively attached.

14 Claims, 10 Drawing Sheets

(51) Int. Cl.
*H04W 36/02* (2009.01)
*H04W 12/06* (2021.01)
*H04W 88/16* (2009.01)
*H04L 9/08* (2006.01)

(56) References Cited

U.S. PATENT DOCUMENTS

2018/0139274 A1    5/2018  Gandhi et al.
2018/0314808 A1*  11/2018  Casey ................... G06F 21/105
2020/0107402 A1*   4/2020  Di Girolamo .......... H04L 67/16

OTHER PUBLICATIONS

May 24, 2019 Search Report issued in French Patent Application No. 18/71087.

* cited by examiner

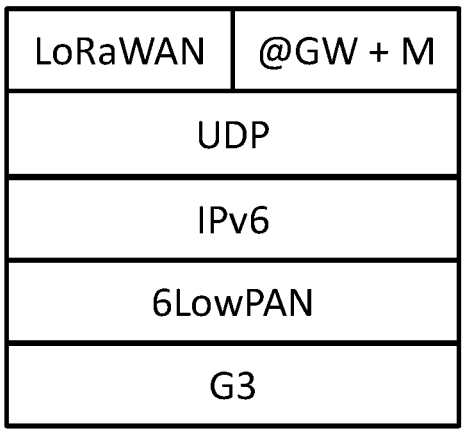 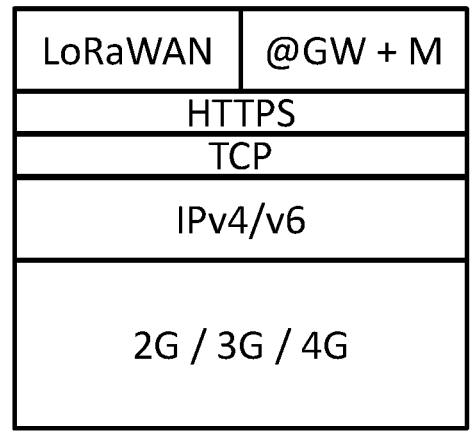
Fig. 7A                              Fig. 7B
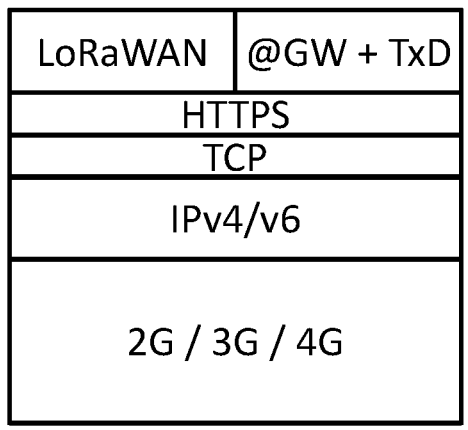 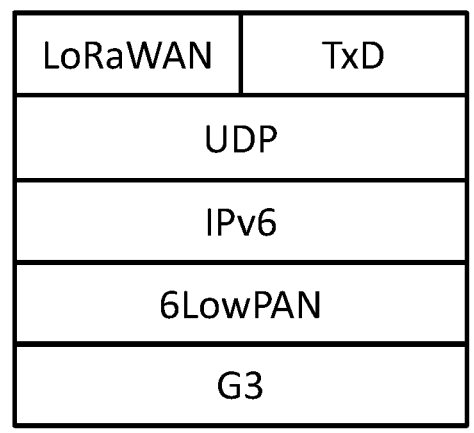
Fig. 7C                              Fig. 7D
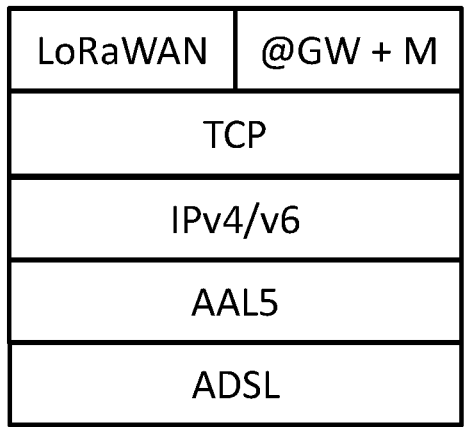 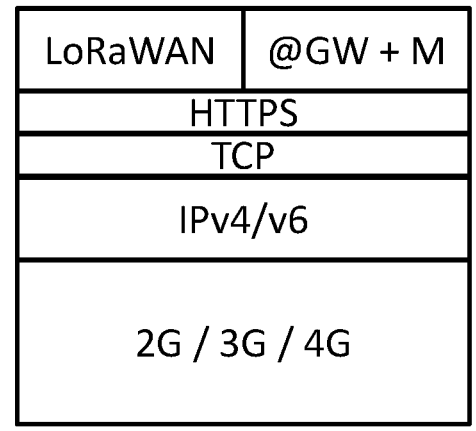
Fig. 8A                              Fig. 8B

METHOD FOR MANAGING HANDOVER ROAMING

TECHNICAL FIELD

The present invention relates to a method for managing handover roaming in the context of a communication system comprising a first network and a second network each based on an LPWAN (Low-Power Wide-Area Network) communication technology and in which the first network comprises subnetworks implementing separate transport protocols.

PRIOR ART

The Internet of Things is emerging. The Internet of Things represents the extension of the internet to things and places in the physical world. Whereas the internet does not normally extend beyond the electronic world, the Internet of Things represents exchanges of information and data coming from devices present in the real world to the internet, such as for example for making a collection of electricity-consumption or water-consumption readings. The Internet of Things is considered to be the third evolution of the internet, referred to as Web 3.0. The Internet of Things is partly responsible for the current increase in the volume of data to be transmitted and stored, and thus gives rise to what is called "Big Data". The Internet of Things has a universal character for designating the putting of objects in communication for varied uses, for example in the industrial, food, e-health and home-automation fields.

To enable communicating objects, also referred to as end devices, to communicate in the context of the Internet of Things, communication systems are established by means of a set of gathering gateways that are situated at geographically high points and are deployed by an operator. Apart from maintenance operations, these gathering gateways are typically fixed and permanent, and communicate with the end devices by radio. Mention can be made for example on this model of the SigFox (registered trade mark) or ThingPark (registered trade mark) networks. These gathering gateways communicate with the end devices by means of medium- or long-range radio communications in accordance with an LPWAN communication technology, such as for example the LoRaWAN (long-range wide-area network) technology, also known by the abbreviation LoRa (long range), from the name of the alliance promoting the LoRaWAN technology. These gathering gateways thus serve as relays between the end devices and a core network, typically consisting of a set of servers, of the communication system.

The end devices are often devices supplied by battery and are therefore intended to go on standby as much as possible in order to increase how long their power supply will last. For this purpose, these end devices apply, in their indirect communications with the core network (via one or more gathering gateways), a communication mechanism referred to as Class A in the LoRaWAN protocol. This mechanism consists of defining, deterministically for an end device in question and the gathering gateway that acts as a relay for this core network, one or more reception windows during which the end device in question listens on the communication medium where the downlink communications must be made. One or more reception windows begin at the end of a period of predefined duration according to an instant of transmission of an uplink frame by the end device in question and also have a predefined duration. Two reception windows are thus defined in the case of the LoRaWAN protocol defined in version 1.1 of the specifications of 11 Oct. 2017. A downlink frame that must be addressed to said end device is then effected in one or other (where applicable) of said reception windows, in particular to acknowledge said uplink frame. It is in fact typically necessary for the end device in question to know that the core network has actually received the uplink frame transmitted by said end device. This approach by reception windows beginning at instants deterministic for the end device in question and the gathering gateway that acts as a relay for the server enables said end device to go on standby in the meantime and thus to preserve its power supply. It should be noted that there exists a development of this reception window mechanism, referred to as Class B in the LoRaWAN protocol, which defines reception windows notified in beacons transmitted by the gathering gateways. And, for the end devices that have a longer-lasting power supply, a third mechanism is available, referred to as Class C in the LoRaWAN protocol, in which the end devices are supposed to listen on the communication medium permanently.

It should be noted that an uplink frame or communication is spoken of when a frame or communication is transferred from an end device to the core network, and that a downlink frame or communication is spoken of in the opposite direction.

However, it is not certain that the round-trip time between the gathering gateways and the core network routinely makes it possible to comply with the expected reception deadlines, more particularly for Class A end devices where the downlink communication opportunities are few. This is particularly the case at the moment when the end device joins the communication system, particularly in situations of handover roaming. This situation is illustrated by the exchange of messages shown schematically in FIG. 2 on the basis of a system architecture shown schematically in FIG. 1, in which two networks of two operators interact in order to form the communication system. It should be distinguished from passive roaming situations where the MAC (medium access control) layer is managed remotely by the core network of the operator with whom a service subscription has been taken out. A main advantage of handover roaming is that the control plane of the MAC layer is managed by the accepting core network, which affords better matching of parameterisings (carrier frequencies, spread factor, etc.) of the end devices vis-à-vis the actual communication conditions with the accepting core network that provides the relay with the core network of the operator with whom the service subscription has been taken out. Compared with passive roaming, this improves the ability to ensure continuity of the services to a very high standard.

FIG. 1 thus illustrates schematically a communication system of the Internet of Things suited to handover roaming. The communication system comprises a first LPWAN network of a first operator interconnected with a second LPWAN network of a second operator. The first network comprises at least one gathering gateway 120, 121, 122 (denoted GW, standing for gateway, in the Figs.). The gathering gateways 120, 121, 122 have available respective communication links with a core network of the first network of the first operator. Three gathering gateways of the first network are shown in FIG. 1, but the communication system may comprise a different number of gathering gateways. The second network also comprises such gathering gateways, which are however not shown for reasons of simplification.

In the communication system, messages must be transferred in the form of frames from a set of end devices (denoted ED, standing for end device, in the Figs.) to the core network. Although the communication system comprises two networks, and therefore two core networks, the latter are perceived as a single core network by the end devices. In other words, handover roaming is transparent for the end devices. Only one end device 110 is shown in FIG. 1 for reasons of simplification, but the communication system typically comprises a large number of end devices.

Every core network has a role of monitoring and collecting information available from the end devices, and the gathering gateways 120, 121, 122 have a role of relay between the end devices and the core network. To make it possible to fulfil this role of relay, each gathering gateway 120, 121, 122 has at least one radio interface enabling said gathering gateway to communicate with at least one end device by relying on a wireless communication medium, and preferentially according to an LPWAN communication technology. Said radio interface is for example of the LoRa type thus making it possible to implement, in the communication system, a LoRaWAN data transmission protocol. Said radio interface is such that an end device may be within radio range of a plurality of gathering gateways, depending on the geographical position of said end device with respect to the gathering gateways 120, 121, 122 and radio conditions in the environment of said end device and gathering gateways 120, 121, 122. This is the case for example with the end device 110 in FIG. 1, which is within radio range of the gathering gateways 120, 121 and 122. In addition, each gathering gateway 120, 121, 122 has at least one other interface enabling said gathering gateway to communicate with the core network. For example, this other interface is a cabled interface making it possible to communicate with the core network via the internet or a radio interface of the GPRS (General Packet Radio Service) type.

The core network of the first operator is suitable for performing handover roaming in collaboration with the core network of the second network. Thus the core network of the first operator comprises a first server FNS (forward network server) 130 responsible for managing the gathering gateways 120, 121, 122 on behalf of said core network and ensuring in particular the deduplication of the uplink frames received from end devices via said gathering gateways 120, 121, 122. The core network of the first operator further comprises a second server SNS (serving network server) 134 coupled to the first server FNS 130. The second server SNS 134 is responsible for controlling the MAC layer for the end devices communicating via the gathering gateways 120, 121, 122 that are managed by the first server FNS 130. The first server FNS 130 and the second server SNS 134 may be implemented in the same hardware entity.

The core network of the second operator comprises a third server HNS (home network server) 140, which is the server that coordinates the core network of the second operator. This third server HNS 130 is the equivalent in the second network to the second server SNS 134 in the first network. Moreover, the second network typically also comprises a server equivalent to the server FNS 130, coupled to the third server HNS 140, and which manages the gathering gateways of the second network.

The core network of the second operator further comprises a fourth server AS 150, which implements an application with which the end device 110 communicates, i.e. exchanges application data, in the context of the service subscription. The core network of the second operator may comprise a plurality of such fourth servers AS 150. Finally, the core network of the second operator further comprises a fifth server JS 160, responsible for managing the subscriptions of the end devices in order to make the necessary subscription checks to enable them to benefit from the services of the fourth server AS 150 when said end devices seek to join the communication system.

The fourth server AS 150 and the fifth server JS 160 are declared to the third server HNS 140, and are thus connected to the third server HNS 140. The second server SNS 134 communicates with the third server HNS 140 that serves as a relay with the fourth server AS 150 and the fifth server JS 160 in the context of the communications with the end device 110. In other words, the third server HNS 140 is responsible for interfacing the fourth server AS 150 and the fifth server JS 160 with the first network and more particularly with the second server SNS 134.

There do however exist situations where the second server SNS 134 of the first operator communicates directly with the fifth server JS 160 of the second operator, particularly when the second server SNS 134 does not yet know the identity of the third server HNS 140 at the moment when the end device 110 joins the network in roaming by means of the first server FNS 130. In this case, the second server SNS 134 uses an identifier, referred to as JoinEUI in the LoRaWAN 1.1 specifications, which uniquely identifies the fifth server JS 160 and which the end device 110 includes in a message that said end device 110 transmits in order to join the network. The second server SNS 134 then contacts a sixth server DNS (domain name server) responsible for effecting resolutions of domain names. This sixth server DNS (not shown) then supplies to the second server SNS 134 an address for contacting the fifth server JS 160 according to the unique identifier in question. The second server SNS 134 then supplies to the fifth server JS 160 another identifier, referred to as DevEUI in the LoRaWAN 1.1 specifications, which uniquely identifies the end device 110 so that the fifth server JS 160 supplies accordingly the identity of the third server FINS 140 in return, since the same server JS 160 can interact with at least one other server equivalent to the third server FINS 140.

It should be noted that other communication links (not illustrated, for reasons of simplification) between the servers may exist in each of the first and second networks, in particular between the fourth server AS 150 and the fifth server JS 150.

When the end device 110 joins the communication systems in handover roaming, exchanges of messages are made, as illustrated schematically in FIG. 2.

In a step 201, the end device 110 transmits a message JOIN-REQ via its radio interface. This message is referred to as Join-request in the LoRaWAN 1.1 specifications. As indicated previously, this JOIN-REQ message includes a unique identifier of the end device 110 and a unique identifier of the fifth server JS 160. This message JOIN-REQ is captured by at least one gathering gateway 120, 121, 122. We shall consider that this JOIN-REQ message was captured by the gathering gateway 121. The latter then, in a step 202, relays the JOIN-REQ message to the first server FNS 130 to which said gathering gateway 121 is attached. The first server FNS 130 then relays the JOIN-REQ message to the second server SNS 131 in a step 203. The second server SNS 134 detects that the JOIN-REQ message relates to a roaming end device. The second server SNS 134 then relays the JOIN-REQ message to the third server HNS 140, in the form of a message HRS-REQ, in a step 204. This message is referred to as HRStartReq in the LoRaWAN Backend Interfaces 1.0 specifications, which deal with roaming in the context of the LoRaWAN 1.1 specifications. This message HRS-REQ typically contains supplementary information on MAC layer management by the second server SNS 134. Next, in a step 205, the third server HNS 140 relays the JOIN-REQ message, in the form of a message JREQ, to the fifth server JS 160. This message is referred to as JoinReq in the LoRaWAN 1.1 specifications. This JREQ message typically contains some of the supplementary information on MAC layer management contained in the HRS-REQ message. The fifth server JS 160 then carries out authentication of the end device 110 and, in the case of successful authentication, manages the security keys necessary for the end device 110 to communicate in the communication system and to benefit from the services of the fourth server AS 150.

Then feedback is supplied to the roaming end device 110. To do this, the fifth server JS 160 transmits to the third server HNS 140, in a step 206, a message JANS in response to the message JREQ. This message is referred to as JoinAns in the LoRaWAN 1.1 specifications. The message JANS includes a message JOIN-ACC to be relayed to the end device 110, and, in the case where the end device 110 is actually authenticated by the fifth server JS 160, the security keys for ensuring secure exchanges with the end device 110, including, in a form encrypted by a key known to the end device 110, the security key to be used for communicating with the fourth server AS 150. The message JOIN-ACC is referred to as Join-accept in the LoRaWAN 1.1 specifications. The message JANS repeats the security keys enabling the end device 110 to communicate in the communication system, so that the communications of the end device 110 can be managed by the core network of the first operator (with the exception therefore of the security key enabling the end device 110 to communicate with the fourth server AS 150). In a step 207, the third server HNS 140 transmits to the second server SNS 134 a message HRS-ANS in response to the message HRS-REQ, which includes the content of the message JANS as well as service profile information relating to the roaming end device 110. This message is referred to HRStartAns in the LoRaWAN Backend Interfaces 1.0 specifications. In a step 208, the second server SNS 134 relays to the first server FNS 130 the message JOIN-ACC created by the fifth server JS 160. Then, in a step 209, the first server FNS 130 selects the gathering gateway responsible for relaying the JOIN-ACC message to the end device 110 and makes it track the message JOIN-ACC. We shall consider that the first server FNS 130 to do this selects the gathering gateway 121. Then, in a step 210, the gathering gateway 121 relays by radio said message JOIN-ACC for the attention of the end device 110.

In the above, it is clear that managing handover roaming involves numerous relays of messages, in particular between the various servers involved. These relays involve latencies in execution that add to significant processing latencies on the part of the servers, in particular with regard to the fifth server JS 160. These message relays are then sometimes not very compatible with latency deadlines to be complied with, particularly in the case of the aforementioned reception windows, which means that the end devices may have to deal with great difficulties in joining the network, because they do not receive any response from the core network in the allotted time.

It is desirable to overcome these drawbacks of the prior art. It is in particular desirable to increase the chances of the end devices successfully joining the network in the case of handover roaming and more particularly in the case where subnetworks implementing separate transport protocols are used for interconnecting the terminal devices with the core network. This is because the use of subnetworks implementing separate transport protocols gives rise to differences in propagation latency that amplify the aforementioned difficulties. It is also desirable to increase the chances for the terminal devices of the communications taking place in the times allotted in the context of the use of these subnetworks implementing separate transport protocols. It is also desirable to be able to rely on existing message formats in the LoRaWAN 1.1 specifications.

DISCLOSURE OF THE INVENTION

To this end, a method is proposed for the management of handover roaming in a communication system comprising a first LPWAN network of a first operator and a second LPWAN network of a second operator. The first network comprises: subnetworks each comprising at least one convergence node and communication nodes integrating gathering gateways, the subnetworks implementing separate respective transport protocols; a first server, for each subnetwork, responsible for managing said gathering gateways included in said subnetwork, each gathering gateway communicating via a single convergence node associated with an associated single first server; and a second server, coupled to any first server, responsible for controlling the MAC layer for end devices communicating via said gathering gateways of the first network. The second network comprises: a third server responsible for interfacing a fourth server and a fifth server with the second server of the first network; the fourth server, which implements an application with which at least one end device of the second operator exchanges application data in the context of a subscription to services defined with the second operator; and the fifth server, responsible for authenticating any end device seeking to join the communication system in order to benefit from the services of the fourth server. The method is such that the communication system transports uplink frames including application data from said at least one end device of the second operator to the fourth server by successive relayings of a said first server, of the second server and of the third server when said at least one end device of the second operator is authenticated and furthermore such that said uplink frames are captured by at least one gathering gateway of the first network. The method is furthermore such that each gathering gateway of at least one subnetwork of the first network, which has detected an end device of the second operator requesting to join the communication system in order to benefit from the services of the fourth server communicates with the fifth server in order to authenticate said end device of the second operator detected, shortcutting the first server associated with said gathering gateway, the second server and the third server by means of a communication interface also shortcutting the convergence node associated with said gathering gateway. Thus the chances for the end devices of the second operator of successfully joining the communication system despite the presence of various subnetworks implementing separate transport protocols and therefore causing various propagation latencies in the case of handover roaming are increased by a significant reduction in latency by shortcutting the first, second and third servers as well as the convergence node associated with the gathering gateway concerned.

According to a particular embodiment, the first network having a range of addresses for all the end devices accessing the communication system via the gathering gateways of the first network, the fifth server manages a predetermined subset of addresses in the range of addresses of the first network and attributes one address among said predetermined subset of addresses to any end device of the second operator that is in handover roaming via the first network and is authenticated by the fifth server. Thus the addressing of the end devices in the first network remains consistent although the first, second and third servers are shortcutted in order to authenticate the end devices of the second operator.

According to a particular embodiment, the communications with each authenticated end device of the second operator being encrypted, the fifth server provides the security keys necessary for said encrypted communications, and, when a gathering gateway of the first network receives a message from the fifth server indicating that an end device of the second operator has been authenticated successfully and including said security keys, said gathering gateway of the first network relays the security keys to the first server associated with said gathering gateway. Thus the encryptions and decipherings of communications can be entrusted to an entity other than the gathering gateway of the first network to which the fifth server has responded.

According to a particular embodiment, the first server relays the security keys to the second server. Thus the encryptions and decipherings of communications can be established at the second server although the first, second and third servers are shortcutted for authenticating said end device of the second operator. In addition, the second server can entrust the encryptions and decipherings of communications to another entity of another subnetwork of the first network by means of another first server.

According to a particular embodiment, in order to request to join the communication system in order to benefit from the services of the fourth server, each end device of the second operator sends a message including an identifier that uniquely identifies the fifth server, and each gathering gateway of the first network capturing said message determines at what address to contact the fifth server by means of an association previously stored in memory between said identifier and the address for contacting the fifth server. Thus each gathering gateway of the first network can determine simply that the fifth server must be directly contacted and how to contact the fifth server.

According to a particular embodiment, on configuration of each gathering gateway of the first network with the identifier that uniquely identifies the fifth server, said gathering gateway of the first network requests a sixth server, responsible for making resolutions of domain names, to supply the address for contacting the fifth server by means of said identifier that uniquely identifies the fifth server. Thus each gathering gateway of the first network has anticipated the need to contact the fifth server in order to manage the end devices of the second operator in handover roaming, which reduces accordingly the processing latency at the moment when an end device of the second operator wishes to join the communication system by handover roaming.

According to a particular embodiment, on configuration of each first server with the identifier that uniquely identifies the fifth server, each first server requests a sixth server, responsible for making resolutions of domain names, to supply the address for contacting the fifth server by means of said identifier that uniquely identifies the fifth server, and each first server propagates an association of said identifier and said address to each gathering gateway that is associated with said first server. Thus the procedure for initialising the gathering gateways of the first network in the context of handover roaming is simple and effective.

According to a particular embodiment, when the fifth server receives a plurality of copies of the same message that emanates from an end device of the second operator and which requests to join the communication system, the fifth server effects a deduplication of data and responds to the first copy in sequence of said message. Thus the management of the parallel transfers of the copies of messages by various gathering gateways of the first network is simple although the first, second and third servers are shortcutted in order to authenticate said end device of the second operator.

According to a particular embodiment, when a gathering gateway of the first network receives a message from the fifth server indicating that an end device of the second operator has been successfully authenticated, said gathering gateway activates a delegation and notifies accordingly the first server with which said gathering gateway is associated, the delegation comprising the following steps: allocating a buffer to said end device of the second operator and storing therein useful data subsequently received asynchronously via said first server for the attention of said end device of the second operator; acknowledging any uplink frame subsequently received from said end device of the second operator while constructing and transmitting, on behalf of the second server, downlink frames including respective acknowledgements of said uplink frames and including, where applicable, useful data stored in the buffer allocated to said end device of the second operator; and relaying the uplink frame to said first server. In addition, on reception of a downlink frame for the attention of said end device of the second operator, said gathering gateway places the useful data, supplied in the downlink frame, in the buffer allocated to said end device of the second operator. Thus the chances for the end devices of the second operator that their communications in the communication system take place in allotted times are increased.

According to a particular embodiment, each gathering gateway of the first network that receives, coming from the first server associated with said gathering gateway, an instruction to deactivate the delegation vis-à-vis an end device of the second operator, performs the following steps: if the buffer allocated to the end device of the second operator is empty, confirming with said first server that said gathering gateway has deactivated the delegation vis-à-vis said end device of the second operator; and, if the buffer allocated to said end device of the second operator is not empty, maintaining the delegation until the buffer is emptied by construction and transmission of said downlink frames by said gathering gateway. Thus the deactivation of the delegation takes place simply and coherently.

According to a particular embodiment, each gathering gateway of the first network that has activated the delegation vis-à-vis an end device of the second operator increments a value of a counter of downlink frames as said downlink frames are constructed for the attention of said end device of the second operator and includes in said downlink frames the incremented value of the downlink frame counter, and, when said gathering gateway deactivates the delegation, said gathering gateway notifies to the first server an up-to-date value of the downlink frame counter. Thus the counting of downlink frames takes place transparently for the end device of the second operator in question.

Another subject matter of the invention is a communication system comprising a first LPWAN network of a first operator and a second LPWAN network of a second operator. The first network comprises: subnetworks each comprising at least one convergence node and communication nodes integrating gathering gateways, the subnetworks implementing separate respective transport protocols; a first server, for each subnetwork, responsible for managing said gathering gateways included in said subnetwork, each gathering gateway communicating via a single convergence node associated with an associated single first server; and a second server, coupled to any first server, responsible for controlling the MAC layer for end devices communicating via said gathering gateways of the first network. The second network comprising: a third server responsible for interfacing a fourth server and a fifth server with the second server of the first network; the fourth server, which implements an application with which at least one end device of the second operator exchanges application data in the context of a subscription to services defined with the second operator; and the fifth server, responsible for authenticating any end device seeking to join the communication system in order to benefit from the services of the fourth server. The communication system being arranged, in the context of a management of handover roaming between the first network and the second network, for transporting uplink frames including application data from said at least one end device of the second operator to the fourth server by successive relayings of a said first server, of the second server and of the third server when said at least one end device of the second operator is authenticated and furthermore when said uplink frames are captured by at least one gathering gateway of the first network. The communication system furthermore being such that each gathering gateway of at least one subnetwork of the first network, which has detected an end device of the second operator requesting to join the communication system in order to benefit from the services of the fourth server, communicates with the fifth server in order to authenticate said end device of the second operator detected, shortcutting the first server associated with said gathering gateway, the second server and the third server by means of a communication interface also shortcutting the convergence node associated with said gathering gateway.

According to a particular embodiment of the method and/or of the communication system mentioned above, a subnetwork of the first network is a powerline communication network wherein said communication nodes are smart electricity meters and wherein each convergence device is a data concentrator, and another subnetwork of the first network is a network providing access to the internet wherein said communication nodes are residential gateways and wherein each convergence device is a DSLAM (Digital Subscriber Line Access Multiplexer).

BRIEF DESCRIPTION OF THE DRAWINGS

The features of the invention mentioned above, as well as others, will emerge more clearly from a reading of the following description of at least one example embodiment, said description being given in relation to the accompanying drawings, among which:

FIG. 7A illustrates schematically a first message encapsulation used in the communication system of the Internet of Things of FIG. 3A;

FIG. 7B illustrates schematically a second message encapsulation used in the communication system of the Internet of Things of FIG. 3A;

FIG. 7C illustrates schematically a third message encapsulation used in the communication system of the Internet of Things of FIG. 3A;

FIG. 7D illustrates schematically a fourth message encapsulation used in the communication system of the Internet of Things of FIG. 3A;

FIG. 8A illustrates schematically a fifth message encapsulation used in the communication system of the Internet of Things of FIG. 3A;

FIG. 8B illustrates schematically a sixth message encapsulation used in the communication system of the Internet of Things of FIG. 3A;

DETAILED DISCLOSURE OF EMBODIMENTS

Figure 3A:
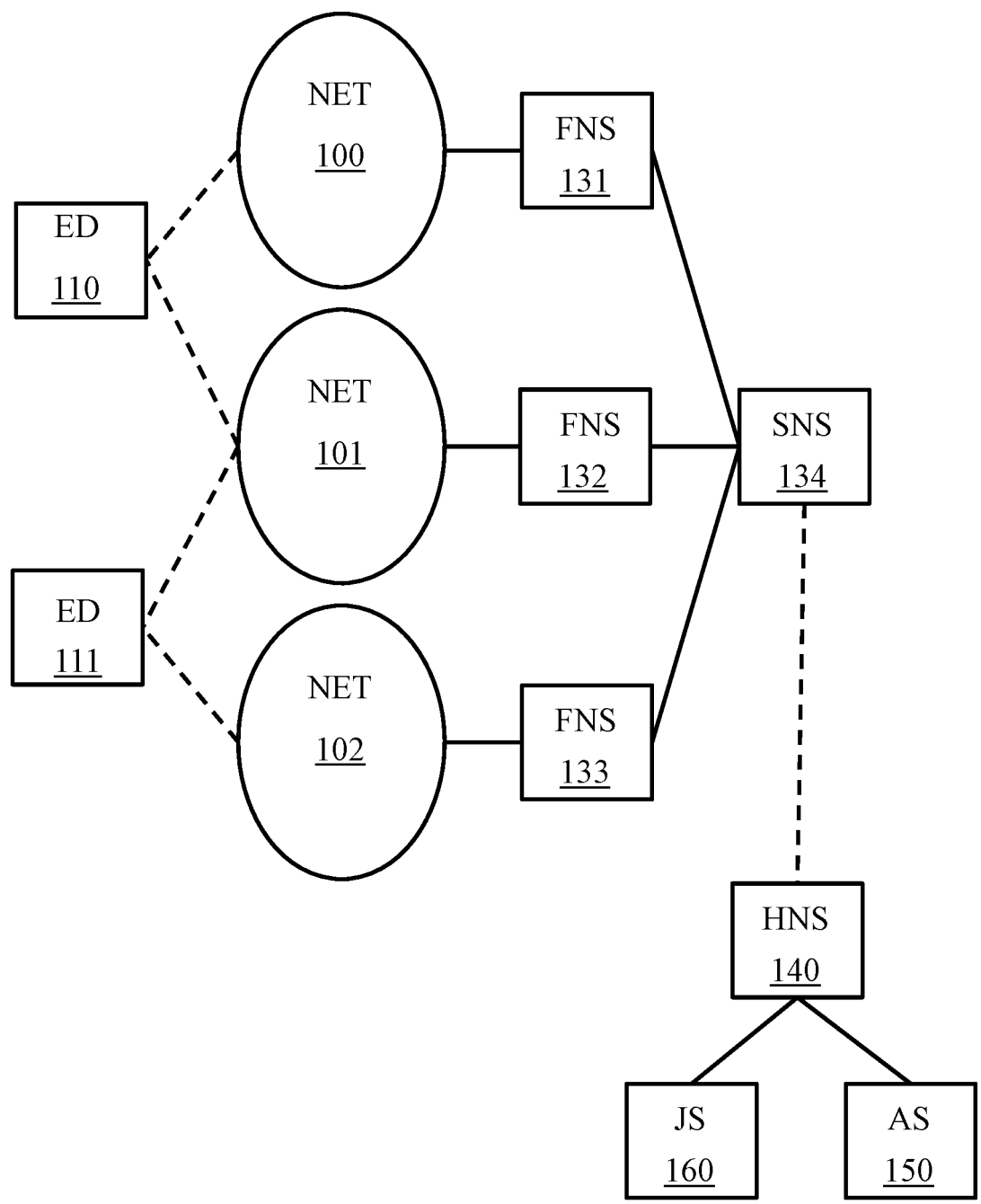
FIG. 3A illustrates schematically a communication system of the Internet of Things in which the present invention can be implemented.

FIG. 3A illustrates schematically a communication system of the Internet of Things in which the present invention can be implemented. The communication system of the Internet of Things of FIG. 3A partly repeats the communication system of the Internet of Things of FIG. 1. The first network however comprises a plurality of subnetworks 100, 101, 102 each comprising at least one convergence node device and communication nodes integrating collection gateways to the LPWAN technology. This aspect is detailed hereinafter in relation to FIGS. 3B and 3C. The subnetworks 100, 101, 102 implement separate respective transport protocols. There may in the first network be a plurality of subnetworks that implement the same transport protocol provided that the first network also includes a different transport protocol subnetwork. There is a first server FNS 131, 132, 133 for each subnetwork 100, 101, 102. Each gathering gateway of the first network communicates with a single first server FNS 131, 132, 133 associated via a single associated convergence node.

FIG. 3A shows, for purely illustrative purposes, another handover roaming end device 111. This aims to show that the uplink frames transmitted by each end device 110, 111 can be captured by gathering gateways of the first network that belong to separate subnetworks.

Figure 1:
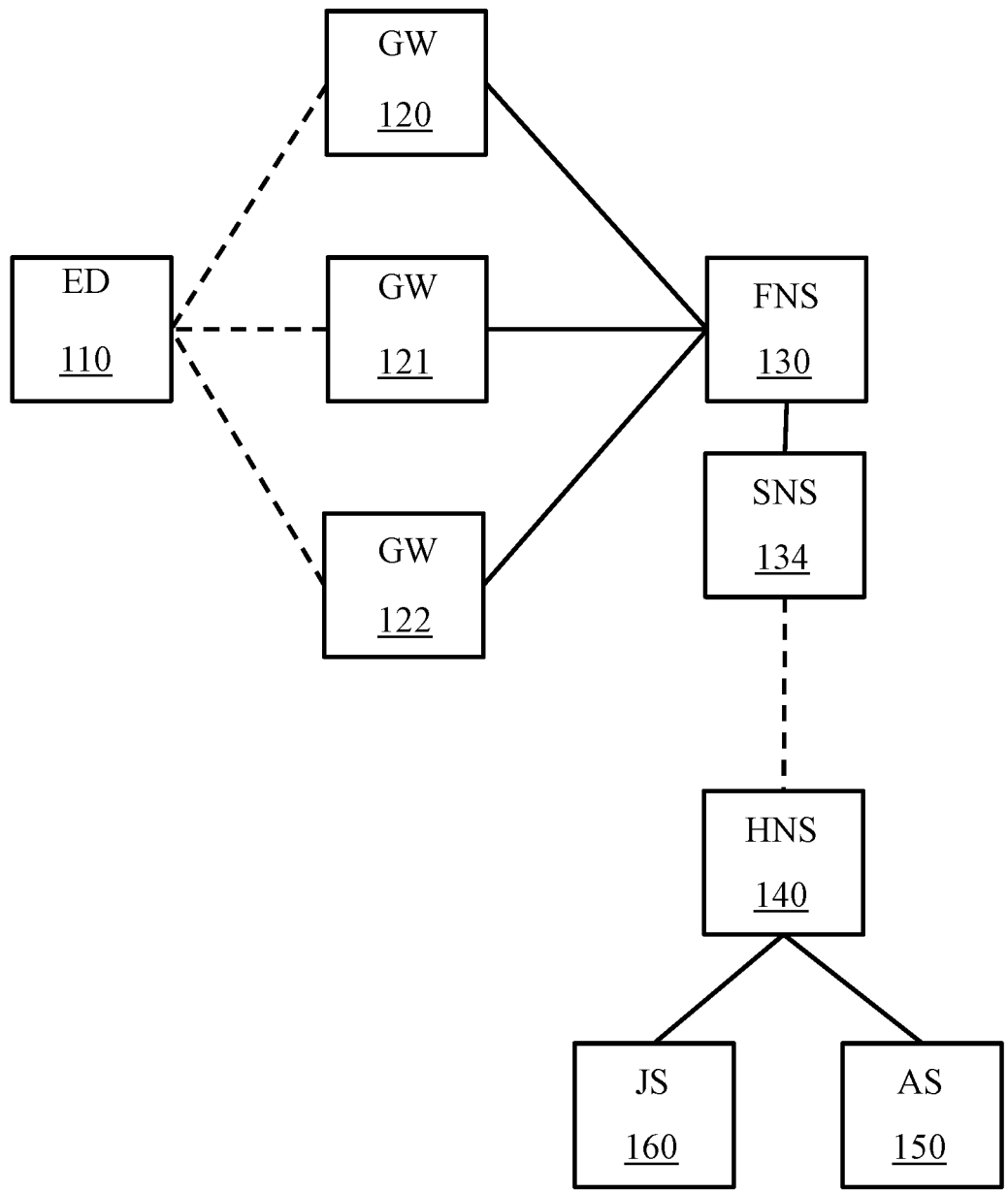
FIG. 1 illustrates schematically a communication system of the Internet of Things according to the prior art.

Unlike the communication system of the Internet of Things of FIG. 1, the communication system of the Internet of Things of FIG. 3A comprises connections between the gathering gateways of at least one subnetwork 100, 101, 102 of the first network on the one hand and the fifth server JS 160 of the second network on the other hand. This aspect is detailed below in relation to FIG. 4. It should be noted that the gathering gateways of one or more subnetworks, or of all the subnetworks 100, 101, 102, can comprise these connections with the fifth server JS 160. If one or more subnetworks, and the connections thereof with their respective first servers FNS 131, 132, 133, have performances in terms of latency superior to those of the other subnetworks of the first network, then said gathering gateways can avoid establishing a direct connection with the fifth server JS 160. It is considered hereinafter, for reasons of simplification, that each gathering gateway of the first subnetwork has a direct connection with the fifth server JS 160.

The fifth server JS 160 is declared to each of the gathering gateways of the first network, which are thus connected to the fifth server JS 160. This declaration of the fifth server JS 160 to each of the gathering gateways of the first network is done following a roaming agreement concluded between the first operator and the second operator. The same type of communication medium can be used between the gathering gateways of the first network and the fifth server JS 160 as between said gathering gateways and the first server FNS 131, 132, 133 with which said gathering gateways are respectively associated. Another type of communication medium may however be used.

As detailed hereinafter, this direct relationship between the gathering gateways of the first network and the fifth server JS 160 makes it possible to simplify the message exchanges by shortcutting the first FNS 131, 132, 133 and second SNS 134 and third HNS 140 servers, and therefore to reduce induced latency, when the end device 110, 111 joins the communication system by handover roaming. Each gathering gateway of the first network further includes a communication interface for communicating with the fifth server JS 160, which also shortcuts the convergence node via which said gathering gateway communicates with the first server FNS 131, 132, 133 that is associated therewith. This aspect is detailed hereinafter in relation to FIG. 4.

The declaration of the fifth server JS 160 to each of the gathering gateways of the first network consists of providing the identifier, called JoinEUI in the LoRaWAN 1.1 specifications, which uniquely identifies the fifth server JS 160. As a reminder, this identifier is included by the end device 110, 111 in the message JOIN-REQ that said end device 110, 111 transmits in order to join the communication system, and it is therefore necessary for each gathering gateway of the first network to know it in advance in order to make the connection between the roaming end device 110,111 and the fifth server JS 160.

In a particular embodiment, following this declaration, each of the gathering gateways of the first network then contacts the sixth server DNS, which provides them with an address for contacting the fifth server JS 160 in accordance with the unique identifier in question.

In a particular embodiment in a variant, the declaration is such that the unique identifier in question is provided in association with the address for contacting the fifth server JS 160.

In a particular embodiment, the declaration is first of all made to each first server FNS 131, 132, 133 following the roaming agreement concluded between the first operator and the second operator, and each first server FNS 131, 132, 133 tracks the declaration in question to each of the gathering gateways with which said first server FNS 131, 132, 133 is associated. This simplifies the declaration of the fifth server JS 160. It should be noted that one possibility is that each first server FNS 131, 132, 133 contacts the sixth server DNS, which supplies to it the address for contacting the fifth server JS 160 in accordance with the unique identifier in question, and that each first server FNS 131, 132, 133 then transmits the unique identifier in question to each of the gathering gateways that is associated with it, in association with the address for contacting the fifth server JS 160.

It should be noted that the communications between the gathering gateway and any server, and between the servers themselves, are preferentially based on the IP protocol (Internet Protocol), as defined in the normative document RFC 791. This aspect is detailed hereinafter in relation to FIGS. 7A to 7D, 8A to 8D, 9A to 9D, 10A and 10B.

Figure 3B:
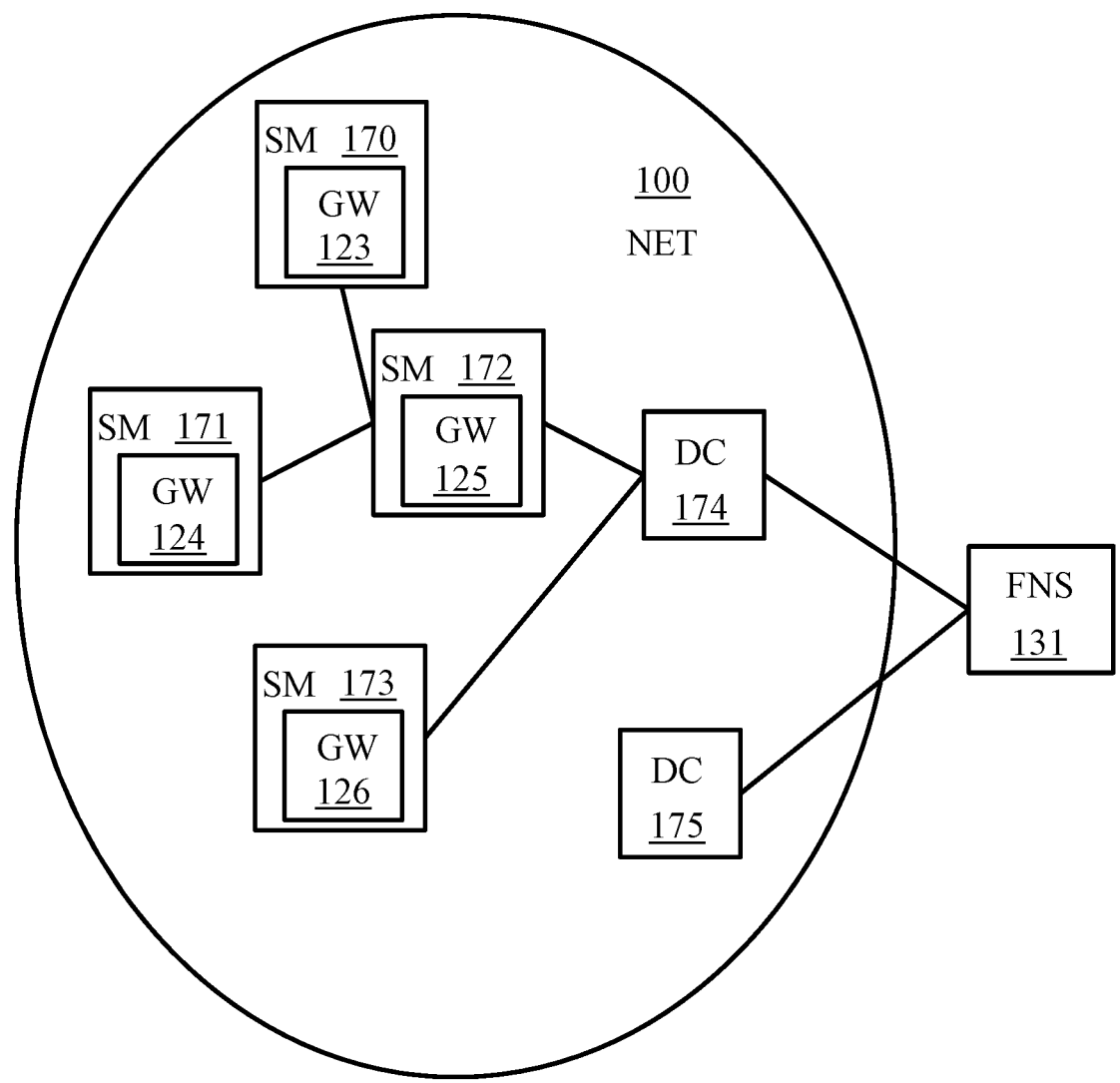
FIG. 3B illustrates schematically a subnetwork of the communication system of the Internet of Things of FIG. 3A.

FIG. 3B illustrates schematically the subnetwork 100 of the communication system of the Internet of Things of FIG. 3A. The subnetwork 100 comprises communication networks 170, 171, 172, 173 that are connected to the convergence node 174 of the subnetwork 100. The communication nodes 170, 171, 172, 173 respectively integrate gathering gateways GW 123, 124, 125, 126. Some communication nodes 172 can fulfil a role of relay between other communication nodes 170, 171 and the convergence node 174. The subnetwork 100 potentially comprises one or more other convergence nodes 175 to which yet other communication nodes are attached (not shown for reasons of simplification). Each convergence node 174, 175 of the subnetwork 100 is attached to the first server FNS 131. The subnetwork 100 is preferentially a powerline communication network, the communication nodes 170, 171, 172, 173 are smart meters SM responsible for monitoring the distribution and the electricity consumption of associated electrical installations, and the convergence nodes 174, 175 are data concentrators DC responsible for interfacing said smart meters SM with a server (not shown) responsible for configuring said smart meters SM and harvesting metering readings supplied by said smart meters SM. For example, the communications between the communication nodes 170, 171, 172, 173 and the convergence node 174 are supported by the G3-PLC protocol or by the PRIME protocol.

Figure 3C:
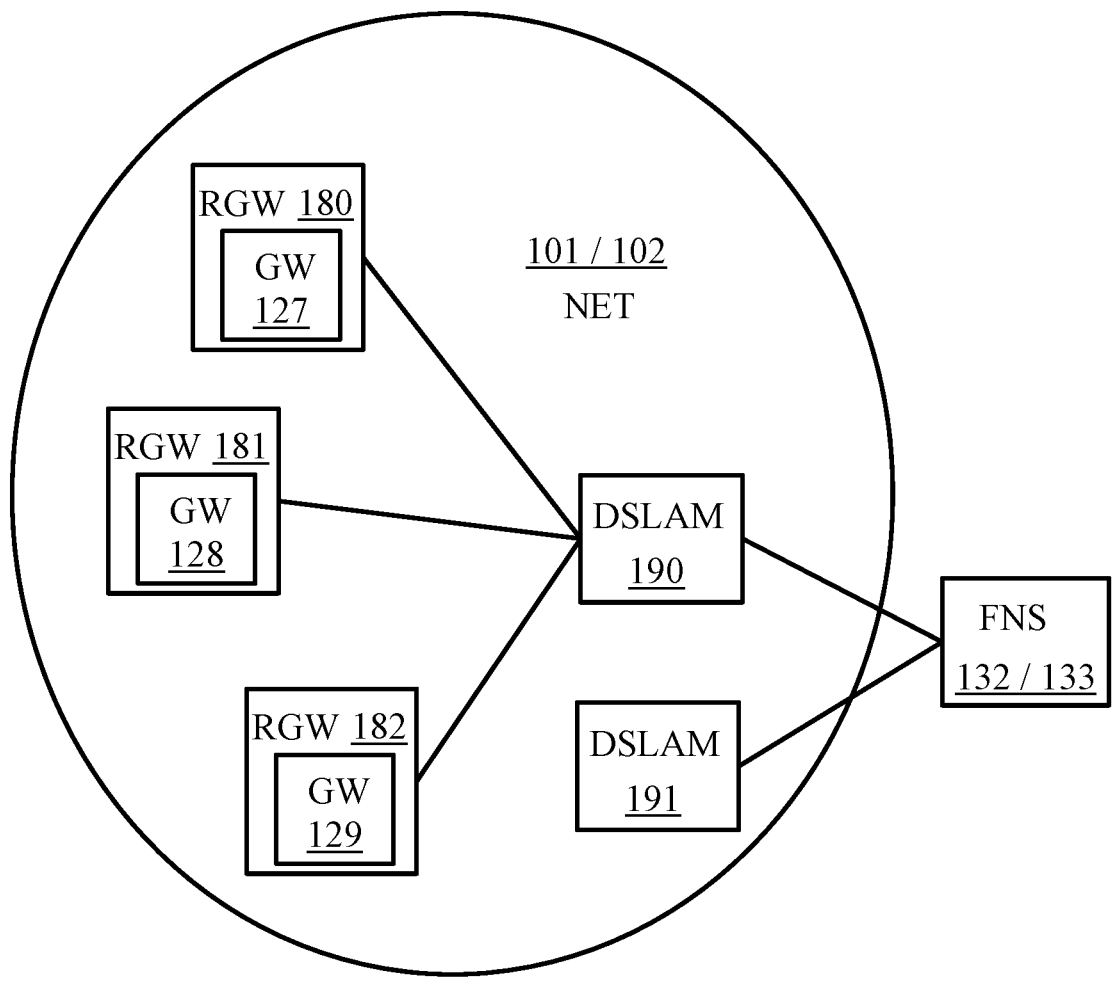
FIG. 3C illustrates schematically another subnetwork of the communication system of the Internet of Things of FIG. 3A.

FIG. 3C illustrates schematically another subnetwork 101, 102 of the communication system of the Internet of Things of FIG. 3A. The subnetwork 101, 102 comprises communication nodes 180, 181, 182 that are connected to a convergence node 190 of the subnetwork 101, 102. The communication nodes 180, 181, 182 respectively integrate gathering gateways GW 127, 128, 129. The subnetwork 100 potentially comprises one or more other convergence nodes 191 to which yet other communication nodes are attached (not shown for reasons of simplification). Each convergence node 190, 191 of the subnetwork 101 is attached to the first server FNS 132. Each convergence node 190, 191 of the subnetwork 102 is attached to the first server FNS 133. The subnetworks 101, 102 are preferentially networks providing access to the internet, the communication nodes 180, 181, 182 are routers in the form of residential gateways RGW and the convergence nodes 190, 191 are digital subscriber line access multiplexers DSLAM. For example, the communications between the communication nodes 180, 181, 182 and the convergence node 190 in the subnetwork 101 are supported by the asymmetric digital subscriber line protocol ADSL, ADSL2 or ADSL2+. For example, the communications between the communication nodes 180, 181, 182 and the convergence node 190 in the subnetwork 102 are supported by the very-high-bit-rate digital subscriber line protocol VDSL or VDSL2.

Figure 4:
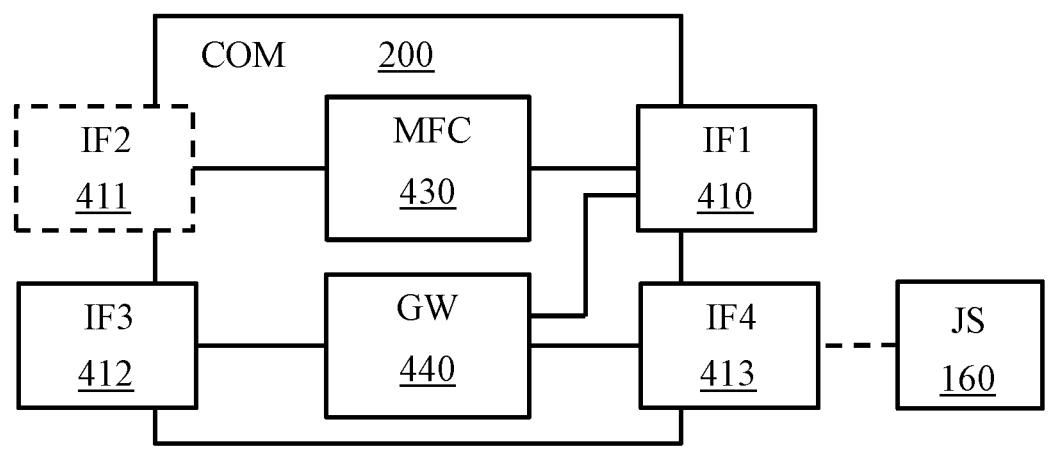
FIG. 4 illustrates schematically a communication node of a subnetwork of the communication system of the Internet of Things of FIG. 3A.

FIG. 4 illustrates schematically a communication node COM 200 of a subnetwork of the communication system of the Internet of Things of FIG. 3A, as for example introduced in FIGS. 3B and 3C. The communication node COM 200 integrates one or more electronic components executing functionalities of a gathering gateway GW 440. The communication network COM 200 further integrates one or more electronic components executing main functionalities MFC 430, which relate to the metering of electricity consumed in the example of a subnetwork 100 described in relation to FIG. 3BG, and which relate to the routing of provision of access to the internet in the example of a subnetwork 101, 102 described in relation to FIG. 3C. The communication network COM 200 may also integrate auxiliary functionalities in the electronic component or components executing the main functionalities MFC 430.

The electronic component or components executing the main functionalities MFC 430 are connected to a first communication interface IF1 410 that makes it possible to communicate with the convergence node to which said communication node COM 200 is attached, and may be connected to at least one second communication interface IF2 411, to make it possible to communicate in the context of the main functionalities MFC 430 and optionally the aforementioned auxiliary functionalities.

The electronic component or components executing the functionalities of a gathering gateway GW 440 are connected to the first communication interface IF1 410, which makes it possible to communicate with the first server FNS 131, 132, 133 via the convergence node to which said communication network COM 200 is attached. The electronic component or components executing the functionalities of a gathering gateway GW 440 are furthermore connected to a third communication interface IF1 412, to make it possible to communicate by radio with the end devices 110, 111. The electronic component or components executing the functionalities of a gathering gateway GW 440 are furthermore connected to a fourth communication interface IF4 413, to make it possible to communicate with the fifth server JS 160 by shortcutting the first server FNSs 131, 132, 133, second server SNS 134 and third server HNS 140, as well as the convergence node to which said communication node COM 200 is attached.

Figure 5:
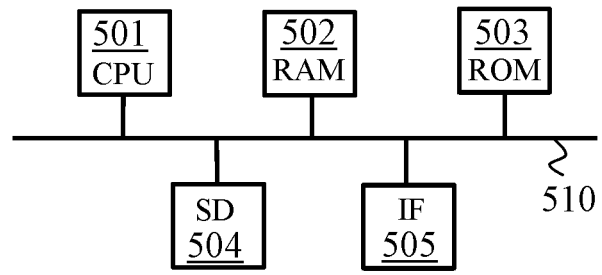
FIG. 5 illustrates schematically a hardware architecture of a communication device in the communication system of the Internet of Things of FIG. 3A.

FIG. 5 illustrates schematically an example of hardware architecture of a communication device of the communication system of FIG. 3A. Each end device and/or each communication node integrating a gathering gateway and/or each convergence node and/or each core network server can be constructed on the basis of such hardware architecture.

The communication device comprises, connected by a communication bus 510: a processor or CPU (central processing unit) 501; a random access memory RAM 502; a read only memory ROM 503; a storage unit or a store medium reader, such as a SD (Secure Digital) card reader 504 or a hard disk drive HDD; one or more communication interfaces IF 505.

The processor 501 is capable of executing instructions loaded in the RAM memory 502 from the ROM memory 503, from an external memory, from a storage medium, or from a communication network. When the communication device in question is powered up, the processor 501 is capable of reading instructions from the RAM memory 502 and executing them. These instructions form a computer program causing the implementation, by the processor 501, of all or some of the algorithms and steps described here in relation to the communication device in question.

Thus all or some of the algorithms and steps described here can be implemented in software form by the execution of a set of instructions by a programmable machine, such as a DSP (digital signal processor) or a microcontroller. All or some of the algorithms and steps described here can also be implemented in hardware form by a machine or a dedicated component, such as an FPGA (field-programmable gate array) or an ASIC (application-specific integrated circuit). In general terms, the communication device in question comprises electronic circuitry suitable and configured for implementing the algorithms and steps described here in relation to the communication device in question.

Figure 6:
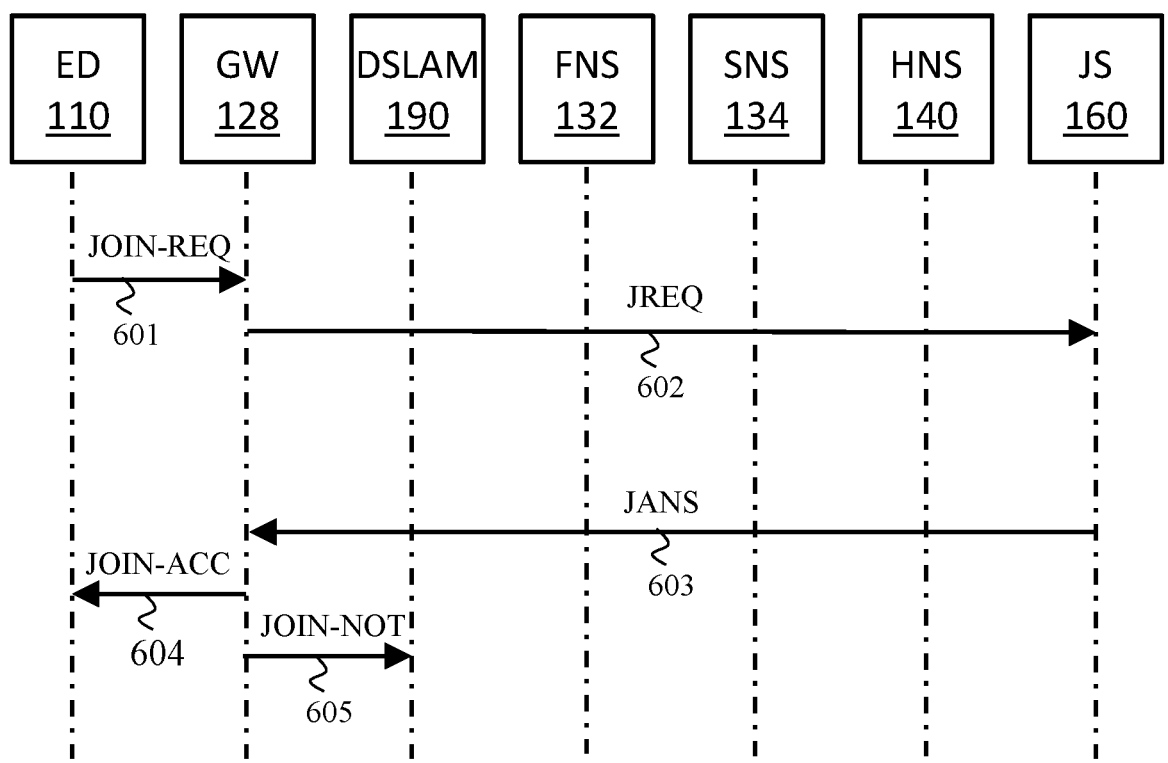
FIG. 6 illustrates schematically message exchanges taking place in the communication system of the Internet of Things of FIG. 3A.

FIG. 6 illustrates schematically message exchanges taking place in the communication system of the Internet of Things of FIG. 3, when the end device 110 (for example) joins the communication system by roaming. These messages are exchanged in respective frames.

Figure 2:
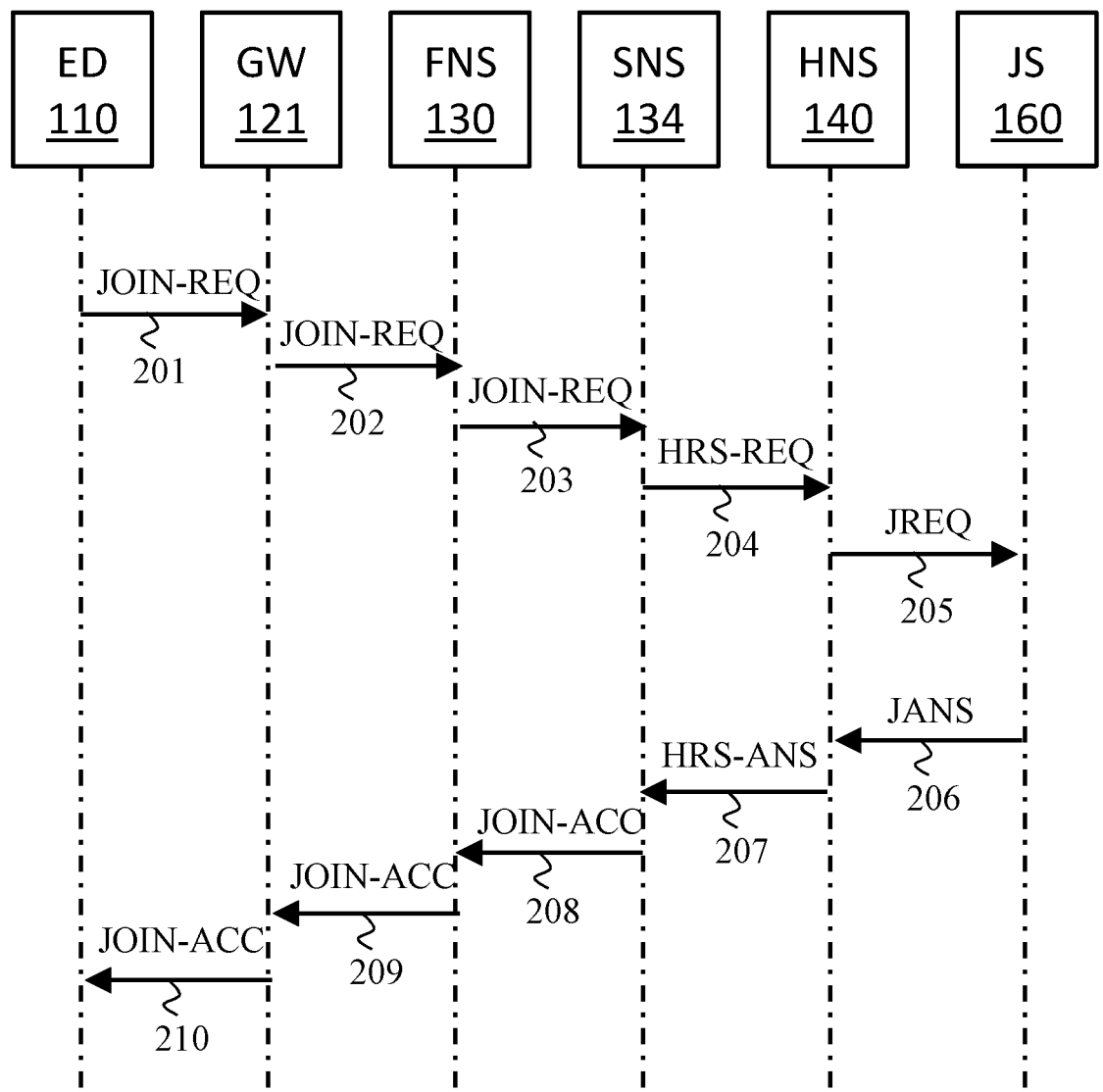
FIG. 2 illustrates schematically message exchanges taking place in the communication system of the Internet of Things of FIG. 1.

In a step 601, the end device 110 transmits a message JOIN-REQ via its radio interface. This step is identical to step 201 described in relation to FIG. 2. This JOIN-REQ message therefore includes a unique identifier of the end device 110, called DevEUI in the LoRaWAN 1.1 specifications, as well as the unique identifier of the fifth server JS 160.

This JOIN-REQ message is captured by at least one gathering gateway of the first network. We shall consider that this JOIN-REQ message is captured by the gathering gateway 128. In a step 602, the gathering gateway 128 directly relays the JOIN-REQ message to the fifth server JS 160, in the form of a message JREQ as previously mentioned. The first server FNS 132 with which the gathering gateway 128 is associated, the second server SNS 134 and the third server HNS 140 are thus shortcutted. The same applies to the convergence node DSLAM 190. By means of the identifier that is contained in the JOIN-REQ message and which uniquely identifies the fifth server JS 160, the gathering gateway 128 detects that the end device 110 is roaming and that the core network of the second operator is responsible for checking that the end device 110 has a suitable subscription, and preferentially for authenticating the end device 110, that is to say confirming that the end device that transmitted the JOIN-REQ message is actually the end device 110 corresponding to the unique identifier supplied.

In the particular case of the message formats defined in the LoRaWAN 1.1 specifications, the message JREQ takes the form of a message JoinReq. The gathering gateway 128 copies, in a field dedicated to the JoinReq message, the unique end device identifier, called DevEUI, that the roaming end device 110 entered in the Join-request message transmitted at step 601. In addition, the values of the fields MACversion, DLSettings and RxDelay are fixed at default values. It should be noted that the DLSettings and RxDelay values may be modified subsequently with the end device 110 by MAC command coming from the second server SNS 134, in order to adjust them to the actual requirements of the core network of the first operator.

On receipt of the JREQ message, the fifth server JS 160 checks that the end device 110 has a suitable subscription for accessing the services of the fourth server AS 150 in handover roaming. Preferentially, the fifth server JS 160 effects the authentication of the end device 110. In a particular embodiment, in the case of a successful authentication, the fifth server JS 160 obtains (e.g. generates) the security keys necessary to the end device 110 for communicating in an encrypted manner in the communication system and benefiting from the services of the fourth server AS 150.

The fifth server JS 160 constructs a message JANS that includes a message JOIN-ACC to be relayed to the end device 110. When the subsequent communications with the end device 110 must be encrypted and the end device 110 is actually authenticated by the fifth server JS 160, the message JOIN-ACC also includes the information enabling the end device 110 to obtain the security keys for protecting the exchanges with the end device 110. The message JOIN-ACC preferentially also includes, in a form encrypted by a key also known to the end device 110, the security key to be used for communicating with the fourth server AS 150. The latter security key is encrypted since it does not have to be known to the gathering gateways of the first network, nor to the core network of the first operator. The message JANS may also include, apart from the JOIN-ACC message, the security keys for protecting the exchanges with the end device 110 (with the exception therefore of the security key enabling the end device 110 to communicate with the fourth server AS 150). This simplifies the recovery of these security keys by the gathering gateway to which the JANS message will be addressed.

When the message formats defined in the LoRaWan 1.1 specifications are used, the fifth server JS 160 can modify the default values proposed in the MACversion, DLSettings and RxDelay fields of the JREQ message transmitted by the gathering gateway 128. This is in particular the case when the roaming agreements concluded between the first operator and the second operator define default values to be used and these default values are entered in the memory of the fifth server JS 160 of the second operator without there being any need to write them in the memory of the gathering gateways of the first operator. As already indicated, the DLSettings and RxDelay values may be modified subsequently with the end device 110 by MAC command coming from the second server SNS 134, in order to adjust them to the actual requirements of the core network of the first operator.

In a particular embodiment, in order to be able to communicate in the communication system, the end device 110 must be dynamically attributed an address, called DevAddr in the LoRaWan 1.1 specifications. In the context of roaming in accordance with the architecture in FIG. 1, this address is attributed by the second server SNS 134. Here, as the second server SNS 134 is not involved in the relaying of the JOIN-REQ message, it is for the fifth server JS 160 to attribute this address. To do this, the management of a predetermined subset of the range of addresses of the first operator is solely entrusted to the fifth server JS 160 of the second operator in the context of the roaming agreement. Provisioning of addresses is spoken of The fifth server JS 160 then attributes an address of said predetermined subset of the range of addresses of the first operator when said fifth server JS 160 successfully authenticates a roaming end device, and indicates in the JOIN-ACC message which address has been thus attributed. This provisioning of addresses can be configured with the second server SNS 134 and with the fifth server JS 160 following the roaming agreement. In a variant, the range of addresses of the first operator the management of which is entrusted to the fifth server JS 160 of the second operator is negotiated by exchanges of messages between the second server SNS 134 and the fifth server JS 160.

The fifth server JS 160 must then distinguish the cases where said first server JS 160 must attribute an address (roaming end device) from the cases where said fifth server JS 160 must not attribute an address (end device that is not roaming). To do this, the format of the JREQ messages sent by the gathering gateways may be separate from the format of the JREQ messages sent by the third server HNS 140, i.e. with a different format. A specific value of a JREQ message field may in a variant be reserved for the gathering gateways and prohibited to the third server HNS 140. In another variant, the fifth server JS 160 having knowledge of the address of the third server HNS 140, the fifth server JS 160 is capable of detecting that a JREQ message received comes from an item of equipment other than the third server HNS 140 and of deciding where applicable to attribute an address from among the provisioned addresses.

Next, in a step 603, the fifth server JS 160 transmits the JANS message in response to the JREQ message received at step 602. The fifth server JS 160 thus responds directly to the gathering gateway 128.

Then, in a step 604, the gathering gateway 128 relays by radio the JOIN-ACC message for the attention of the end device 110. The gathering gateway 128 recovers, in the JOIN-ACC message, the address attributed to the end device 110 by the fifth server DNS 160. The gathering gateway 128 also recovers in the JANS message, where applicable, the security keys useful to the first core network. In a step 605, the gathering gateway 128 informs the core network of the first operator that the JOIN-ACC message has been transmitted to the end device 110. To do this, the gathering gateway 121 transmits to the first server FNS 132 a notification message JOIN-NOT including the unique identifier of the end device 110, as well as the address attributed by the fifth server JS 160 to the end device 110. The core network of the first network is thus informed of the presence of the roaming end device 110.

In the case where the subsequent communications with the end device 110 must be encrypted, the notification message JOIN-NOT includes the security keys recovered by the gathering gateway 128. This enables the core network of the first network to authenticate and decipher the communications from the end device 110 on behalf of the second operator in the context of handover roaming. It is the responsibility of the first server FNS 132 to track the appropriate information to the second server SNS 134 (not shown in FIG. 6). In the case where a delegation (as described below) is established, this also enables the core network of the first network to entrust the delegation to another gathering gateway.

In the case where the JOIN-REQ message is captured by at least one other gathering gateway of the first network, each said other gathering gateway also relays the JOIN-REQ message to the fifth server JS 160, in the same way as described above vis-à-vis the gathering gateway 128. In the case of a Join-request message in accordance with the LoRaWAN 1.1 specifications, it is for example possible for the fifth server JS 160 to detect the situation while noting that the field "Nonce" has the same value in the various JOIN-REQ messages thus received. The fifth server JS 160 is then responsible for deduplicating the JOIN-REQ messages thus received and deciding to which gathering gateway to respond among the gathering gateways that relayed the JOIN-REQ message. In a particular embodiment, the fifth server JS 160 responds to the very first gathering gateway that relayed to it the JOIN-REQ message. In a variant, the fifth server JS 160 responds to a gathering gateway selected randomly from among the gathering gateways that relayed the JOIN-REQ message. In another variant, each gathering gateway relaying the JOIN-REQ message indicates in association a received signal strength indicator RSSI coming from the end device 110, and the fifth server JS 160 responds to the gathering gateway that supplies the best received signal strength indicator coming from the end device 110.

Thus, by providing communications directly between the gathering gateways of the first operator and the fifth server JS 160 of the second operator, the latency between the transmission of the JOIN-REQ message by the roaming end device 110 and the reception of the JOIN-ACC message by said end device 110 is reduced.

When the end device 110 has received the JOIN-ACC message that confirms that the authentication has succeeded, the end device 110 has joined the communication system. The end device 110 is then enabled to make uplink communications to the fourth server AS 150 and to receive downlink communications from the core network. The communications between the end device 110 and the fourth server AS 150 are performed by successive relayings from the DSLAM convergence node 190 and the first FNS 132, second SNS 134 and third HNS 140 servers to the fourth server AS 150.

When the communications are encrypted, the uplink communications are authenticated by the core network of the first network by means of the security keys supplied by the fifth server JS 160, typically by the second server SNS 134 after relaying by the first server FNS 132. The content of the uplink communications is then relayed by the second server SNS 134 to the third server HNS 140, which next relays said content to the fourth server AS 150 for application processing. Responsible for managing the MAC layer, the second server SNS 134 acknowledges the uplink frames coming from the roaming end device 110 and relays, to said end device 110, the data received from the fourth server AS 150 for the attention of said roaming end device 110 and, where applicable, encrypts the downlink frames.

The questions of latency are less preponderant in the case of the processing of said uplink frames since there is no intervention by the fifth server JS 160, the processing operations of which, in particular for authenticating and obtaining the security keys, have a significant impact at the time when the end device joins the communication system. A particular embodiment however makes it possible also to improve the latency in the context of the processing of the uplink frames and the management of the downlink frames. Management of the acknowledgements of the uplink frames is then in particular entrusted to a gathering gateway. "Delegation" is then spoken of. This approach by delegation is particularly advantageous in the case of the end devices that listen on the communication medium and mainly during the reception windows defined according to the instants of transmission of their uplink frames, that is to say the end devices in "Class A" and "Class B" in the LoRaWAN 1.1 specifications. This aspect is detailed below in relation to FIGS. 11 to 13.

FIG. 7A illustrates schematically a first message encapsulation used in the example where the subnetwork 100 is a powerline network in accordance with the G3-PLC protocol. The bottom protocol layer is that of the G3-PLC protocol, surmounted by a protocol layer of the 6LowPAN type (IPv6 Low-power Wireless Personal Area Networks), surmounted by a protocol layer of the IPv6 type, surmounted by a protocol layer of the UDP (User Datagram Protocol) type. It should be noted that the TCP protocol (Transmission Control Protocol) may be used in place of the UDP protocol. These layers form a protocol stack encapsulating LoRaWAN messages relayed from the gathering gateway GW integrated in a smart meter SM to the convergence node DC to which said smart meter SM is attached. The LoRaWAN messages are accompanied by containers specifying the IP addresses of the gathering gateways GW respectively concerned and other information M, such as received signal strength indicators RSSI and information representing respective instants of reception of said LoRaWAN messages coming from the end devices respectively concerned.

FIG. 7B illustrates schematically a second message encapsulation used in the example where the subnetwork 100 is a powerline network, for example in accordance with the G3-PLC protocol. The bottom protocol layer is that of a protocol for mobile access to the internet (for example of the 2G, 3G or 4G type), surmounted by a protocol layer of the IPv6 type, surmounted by a protocol layer of the TCP type, surmounted by a protocol layer of the HTTPS type (HyperText Transfer Protocol Secure). These layers form a protocol stack encapsulating LoRaWAN messages relayed from the convergence node DC in question to the first server FNS 131. The LoRaWAN messages are accompanied respectively by the same containers as in FIG. 7A.

FIG. 7C illustrates schematically a third message encapsulation used in the example where the subnetwork 100 is a powerline network, for example in accordance with the G3-PLC protocol. The bottom protocol layer is that of the protocol for mobile access to the internet of FIG. 7B, surmounted by a protocol layer of the IPv6 type, surmounted by a protocol layer of the TCP type, surmounted by a protocol layer of the HTTPS type. These layers form a protocol stack encapsulating LoRaWAN messages relayed from the first server FNS 131 to the convergence node DC in question. The LoRaWAN messages are accompanied by respective containers specifying the IP addresses of the gathering gateways GW respectively concerned and information TxD representing respective instants at which said LoRaWAN messages are supposed to be transmitted to the end devices concerned.

FIG. 7D illustrates schematically a fourth message encapsulation used in the example where the subnetwork 100 is a powerline network in accordance with the G3-PLC protocol. The bottom protocol layer is that of the G3-PLC protocol, surmounted by a protocol layer of the 6LowPAN type, surmounted by a protocol layer of the IPv6 type, surmounted by a protocol layer of the UDP type, as with FIG. 7A. These layers form a protocol stack encapsulating LoRaWAN messages relayed from the convergence node DC concerned to the smart meter SM integrating the integrated gathering gateway GW concerned. The LoRaWAN messages are accompanied by containers specifying the information TxD representing respective instants at which said LoRaWAN messages are supposed to be transmitted to the end devices concerned.

FIG. 8A illustrates schematically a fifth message encapsulation used in the example where the subnetwork 101 is a network providing access to the internet of the ADSL, ADSL2 or ADSL2+ type. The bottom protocol layer is that of the ADSL, ADSL2 or ADSL2+ protocol, surmounted by a protocol layer of the AAL5 type (asynchronous transfer mode adaptation layer 5), surmounted by a protocol layer of the IPv6 type, surmounted by a protocol layer of the TCP type. These layers form a protocol stack encapsulating LoRaWAN messages relayed from the gathering gateway integrated in a residential gateway RGW to the convergence node DSLAM to which said residential gateway RGW is attached. The LoRaWAN messages are accompanied by containers specifying the IP addresses of the gathering gateways respectively concerned and other information M, such as the received signal strength indicators RSSI and the information representing respective instants of reception of said LoRaWAN messages coming from the end devices respectively concerned.

FIG. 8B illustrates schematically a sixth message encapsulation used in the example where the subnetwork 101 is a network providing access to the internet of the ADSL, ADSL2 or ADSL2+ type. The sixth encapsulation, which forms a protocol stack encapsulating LoRaWAN messages relayed from the convergence node DSLAM in question to the first server FNS 132, is identical to that of FIG. 7B.

Figure 8C:
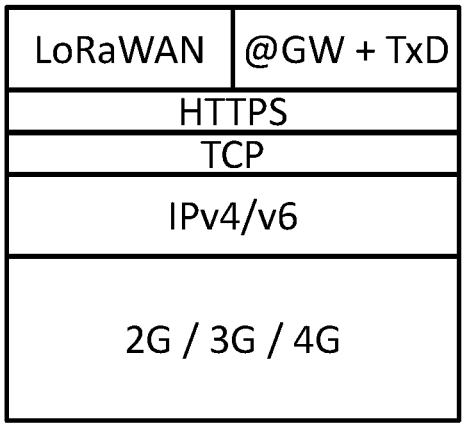
FIG. 8C illustrates schematically a seventh message encapsulation used in the communication system of the Internet of Things of FIG. 3A.

FIG. 8C illustrates schematically a seventh message encapsulation used in the example where the subnetwork 101 is a network providing access to the internet of the ADSL, ADSL2 or ADSL2+ type. The seventh encapsulation, which forms a protocol stack encapsulating LoRaWAN messages relayed from the first server FNS 132 to the convergence node DSLAM concerned, is identical to that of FIG. 7C.

Figure 8D:
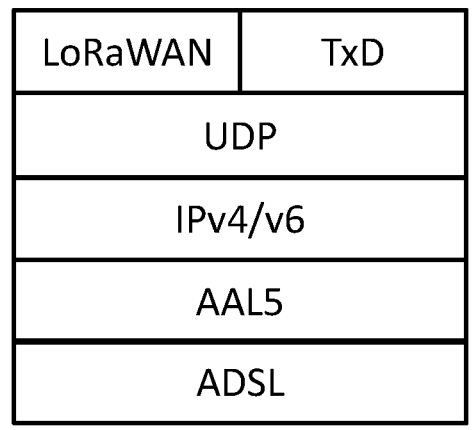
FIG. 8D illustrates schematically an eighth message encapsulation used in the communication system of the Internet of Things of FIG. 3A.

FIG. 8D illustrates schematically an eighth encapsulation of messages used in the example where the subnetwork 101 is a network providing access to the internet of the ADSL, ADSL2 or ADSL2+ type. The bottom protocol layer is that of the ADSL, ADSL2 or ADSL2+ protocol, surmounted by a protocol layer of the AAL5 type, surmounted by a protocol layer of the IPv6 type, surmounted by a protocol layer of the TCP type, as with FIG. 8A. These layers form a protocol stack encapsulating LoRaWAN messages relayed from the convergence node DSLAM concerned to the residential gateway RGW integrating the integrated gathering gateway GW concerned. The LoRaWAN messages are accompanied by containers specifying the information TxD representing respective instants at which said LoRaWAN messages are supposed to be transmitted to the end devices concerned.

Figure 9A:
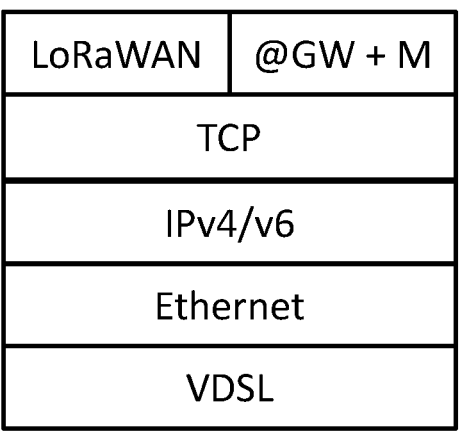
FIG. 9A illustrates schematically a ninth message encapsulation used in the communication system of the Internet of Things of FIG. 3A.

FIG. 9A illustrates schematically a ninth message encapsulation used in the example where the subnetwork 102 is a network providing access to the internet of the VDSL or VDSL2 type. The bottom protocol layer is that of the VDSL or VDSL2 type, surmounted by a protocol layer of the Ethernet type, surmounted by a protocol layer of the IPv6 type, surmounted by a protocol layer of the TCP type. These layers form a protocol stack encapsulating LoRaWAN messages relayed from the gathering gateway integrated in a residential gateway RGW to the convergence node DSLAM to which said residential gateway RGW is attached. The LoRaWAN messages are accompanied by containers specifying the IP addresses of the gathering gateways respectively concerned and other information M, such as the received signal strength indicators RSSI and the information representing the respective instants of reception of said LoRaWAN messages coming from the end device concerned.

Figure 9B:
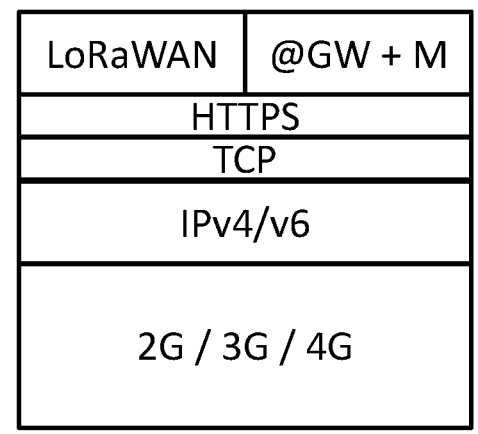
FIG. 9B illustrates schematically a tenth message encapsulation used in the communication system of the Internet of Things of FIG. 3A.

FIG. 9B illustrates schematically a tenth message encapsulation used in the example where the subnetwork 102 is a network providing access to the internet of the VDSL or VDSL2 type. The tenth encapsulation, which forms a protocol stack encapsulating LoRaWAN messages relayed from the convergence node DSLAM in question to the first server FNS 133, is identical to that of FIG. 7B.

Figure 9C:
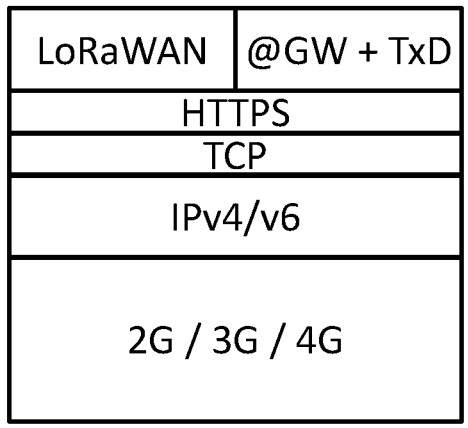
FIG. 9C illustrates schematically an eleventh message encapsulation used in the communication system of the Internet of Things of FIG. 3A.

FIG. 9C illustrates schematically an eleventh message encapsulation used in the example where the subnetwork 102 is a network providing access to the internet of the VDSL or VDSL2 type. The eleventh encapsulation, which forms a protocol stack encapsulating LoRaWAN messages relayed from the first server FNS 133 to the convergence node DSLAM concerned, is identical to that of FIG. 7.

Figure 9D:
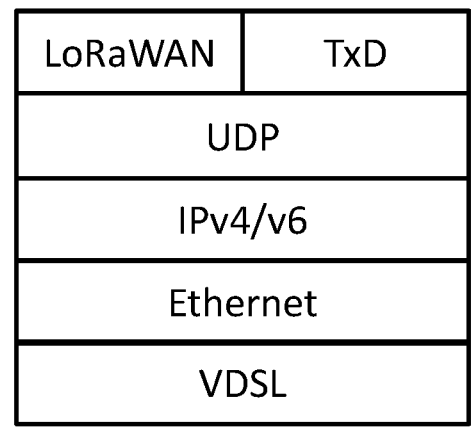
FIG. 9D illustrates schematically a twelfth message encapsulation used in the communication system of the Internet of Things of FIG. 3A.

FIG. 9D illustrates schematically a twelfth message encapsulation used in the example where the subnetwork 102 is a network providing access to the internet of the VDSL or VDSL2 type. The bottom protocol layer is that of the VDSL or VDSL2 protocol, surmounted by a protocol layer of the Ethernet type, surmounted by a protocol layer of the IPv6 type, surmounted by a protocol layer of the TCP type, as with FIG. 9A. These layers form a protocol stack encapsulating LoRaWAN messages relayed from the convergence node DSLAM concerned to the residential gateway RGW integrating the integrated gathering gateway GW concerned. The LoRaWAN messages are accompanied by containers specifying the information TxD representing respective instants at which said LoRaWAN messages are supposed to be transmitted to the end devices concerned.

Figure 10A:
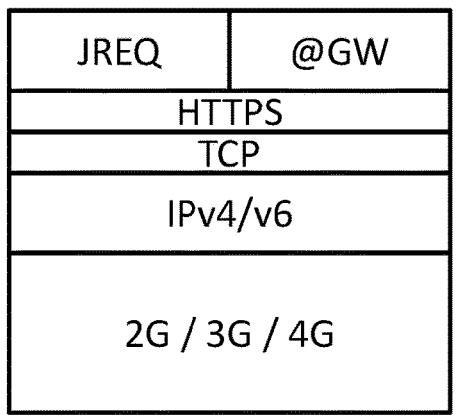
FIG. 10A illustrates schematically a thirteenth message encapsulation used in the communication system of the Internet of Things of FIG. 3A.

FIG. 10A illustrates schematically a thirteenth message encapsulation used in the communication system of the Internet of Things of FIG. 3A, when a gathering gateway GW communicates directly with the fifth server JS 160. The bottom protocol layer is that of a protocol for mobile access to the internet (for example of the 2G, 3G or 4G type), surmounted by a protocol layer of the IPv6 type, surmounted by a protocol layer of the TCP type, surmounted by a protocol layer of the HTTPS type. These layers form a protocol stack encapsulating JREQ messages, as mentioned in relation to FIG. 6, transmitted from the gathering gateways GW respectively concerned to the fifth server JS 160. The JREQ messages are accompanied by respective containers specifying the IP addresses of the gathering gateways GW respectively concerned.

Figure 10B:
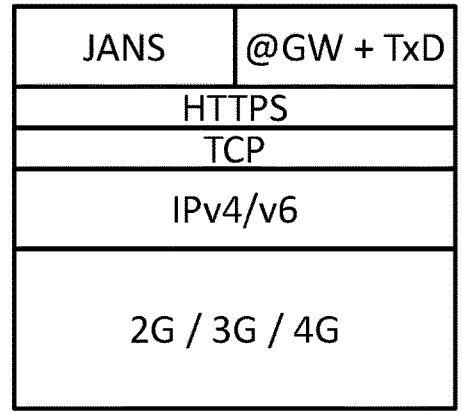
FIG. 10B illustrates schematically a fourteenth message encapsulation used in the communication system of the Internet of Things of FIG. 3A.

FIG. 10B illustrates schematically a fourteenth message encapsulation used in the communication system of the Internet of Things of FIG. 3A, when the fifth server JS 160 communicates directly with a gathering gateway GW. The bottom protocol layer is that of the protocol for mobile access to the internet of FIG. 10A, surmounted by a protocol layer of the IPv6 type, surmounted by a protocol layer of the TCP type, surmounted by a protocol layer of the HTTPS type. These layers form a protocol stack encapsulating JANS messages transmitted from the fifth server JS 160 to the gathering gateways GW respectively concerned. These JANS messages are accompanied by respective containers specifying the IP addresses of the gathering gateways GW respectively concerned and information TxD representing the respective instants at which the corresponding JOIN-ACC messages are supposed to be transmitted to the end devices concerned.

It should be noted that, in a variant, it is possible to use the IPv4 protocol instead of the IPv6 protocol for all the protocol encapsulations relating to FIGS. 7A to 10B, except for FIGS. 7A and 10D, which do not comprise the IPv6 protocol.

Figure 11:
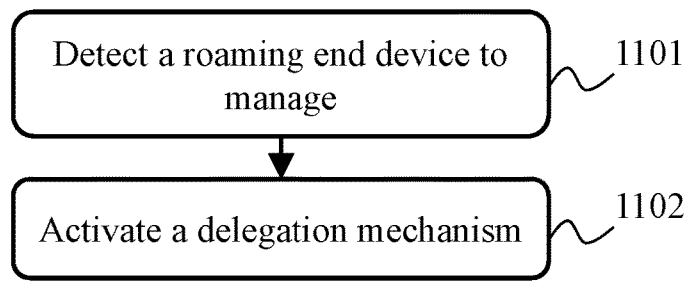
FIG. 11 illustrates schematically a delegation activation algorithm.

FIG. 11 illustrates schematically an algorithm for delegation activation vis-à-vis a handover roaming end device, in a particular embodiment. The algorithm in FIG. 11 is implemented by each gathering gateway of the first network. We shall consider by way of illustration that the algorithm in FIG. 11 is implemented by the gathering gateway 128.

In a step 1101, the gathering gateway 128 detects a roaming end device to be managed. This is the case when the gathering gateway 128 has transmitted a JREQ message to the fifth server JS 160 for said roaming end device and has in return received a JANS message from the fifth server JS 160. An "elected gathering gateway" can then be spoken of since it has been selected, here by the fifth server JS 160, for establishing the delegation. Another case arises when the first server FNS 132, or the second server SNS 134, decides subsequently to entrust the delegation to another gathering gateway GW, in which case the first server FNS 132 informs the gathering gateway GW to which the delegation had until then been entrusted of this, and awaits acknowledgement. Next, the first server FNS 132, or the second server SNS 134 via the first server FNS 131, 133 concerned, sends to this other gathering gateway GW an instruction to activate the delegation for said handover roaming end device. This is because the delegation vis-à-vis an end device can be entrusted only to a single gathering gateway GW at a time, in order to avoid any conflict of uplink-frame acknowledgement.

In a step 1102, the gathering gateway 128 internally activates the delegation for the roaming end device in question. The gathering gateway 128 thus keeps track of having to acknowledge, on behalf of the core network of the first network, the uplink frames received from said roaming end device.

In the context of the activation of the delegation, the gathering gateway 128 initialises a buffer delegated to the downlink transmissions intended for the end device in question. This buffer is therefore allocated to said roaming end device and makes it possible to make asynchronous, from the point of view of the core network, the downlink transmissions intended for said roaming end device with respect to the uplink transmissions coming from said roaming end device. In the case where the first server FNS 132 seeks to entrust the delegation to another gathering gateway GW, the gathering gateway 128 checks whether the buffer associated with the delegation in question is empty or not. In other words, the gathering gateway 128 checks whether useful data for the attention of the roaming end device in question are still awaiting transmission. If the buffer is empty, the gathering gateway 128 is enabled to deactivate the delegation and to send an acknowledgement to the first server FNS 130; otherwise the gathering gateway 128 must continue to acknowledge the uplink frames coming from said roaming end device until the buffer becomes empty. Once the buffer is empty, the gathering gateway 128 stops acknowledging the uplink frames coming from said roaming end device, transmits the acknowledgement to the first server FNS 132, and releases the buffer that was allocated to the delegation in question. In some embodiments, uplink-frame counters are maintained by the end devices and downlink-frame counters are maintained by the core network. The current values of these counters are indicated respectively in dedicated fields of the uplink frames and downlink frames. In the case of a delegation, the downlink-frame counter associated with the roaming end device to which the delegation applies is maintained by the elected gathering gateway GW. Then, in the acknowledgement transmitted to the first server FNS 132, the gathering gateway 128 includes the value of the downlink-frame counter. The first server FNS 132, or the server SNS 134 where applicable, informs the other gathering gateway GW to which the delegation is entrusted of this, so that this other gathering gateway GW can ensure continuity of the counting of the downlink frames. This makes it possible to ensure that the delegation remains transparent for said roaming end device.

Figure 12:
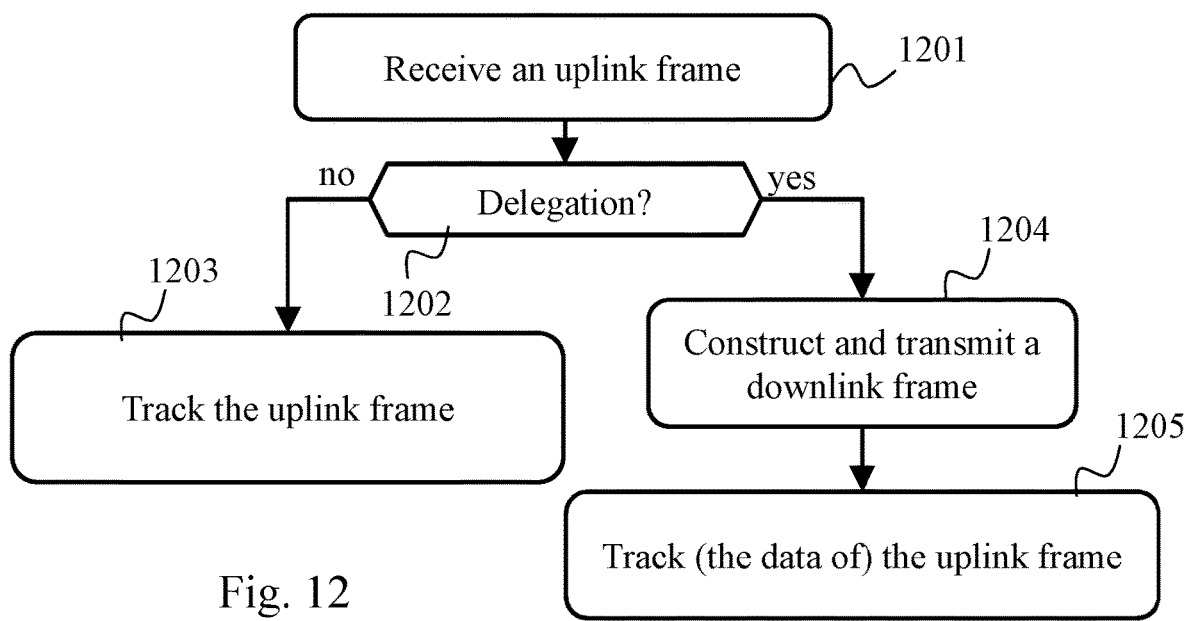
FIG. 12 illustrates schematically an uplink-frame processing algorithm.

FIG. 12 illustrates schematically an uplink-frame processing algorithm. The algorithm in FIG. 12 is implemented by each gathering gateway of the first network, in a particular embodiment. We shall consider by way of illustration that the algorithm in FIG. 12 is implemented by the gathering gateway 128.

In a step 1201, the gathering gateway 128 receives an uplink frame coming from an end device. The uplink frame specifies the address of the end device from which said uplink frame emanates.

In a step 1202, the gathering gateway 128 checks whether the end device is a roaming end device for which the delegation has been activated with the gathering gateway 128. If such is the case, a step 1204 is performed; otherwise a step 1203 is performed.

In step 1203, the gathering gateway 128 tracks the uplink frame to the core network, namely to the first server FNS 132, so that said uplink frame can arrive at the fourth server AS 150 so as to process the applicative content thereof. The gathering gateway 128 here serves simply as a relay and temporarily keeps track of the fact that feedback is expected from the core network vis-à-vis said uplink frame, at least for acknowledging said uplink frame and optionally for providing additional useful data.

The gathering gateway 128 keeps track of the reception of said uplink frame and of the instant at which said uplink frame is received, so as to be able subsequently to determine at what moment to transmit in response a downlink frame comprising, at least, an acknowledgement of said uplink frame. When the gathering gateway 128 subsequently receives from the core network the downlink frame to be tracked to the end device in question in response to said uplink frame, the core network supplies time information representing a duration and the gathering gateway 128 adds said duration to the instant at which said uplink frame was received, in order to determine at what moment to transmit said downlink frame.

In a variant, the gathering gateway 128 schedules at least one reception window for said end device, in which the gathering gateway 128 is supposed to relay a downlink frame that will subsequently be supplied by the core network. The gathering gateway 128 then monitors that it receives a downlink frame to be tracked to the end device in question in response to said uplink frame within a suitable time for complying with a said reception window thus programmed.

In step 1204, the gathering gateway 128 must acknowledge, on behalf of the core network, the uplink frame received at step 1201. This means that the end device concerned is roaming and that the gathering gateway 128 has delegation for anticipating the acknowledgements intended for said end device. When the acknowledgement must be done in a said reception window defined according to an instant of transmission of said uplink frame, the gathering gateway 128 ensures that said end device is listening on the communication medium. The gathering gateway 128 checks whether the buffer associated with said end device contains useful data supplied by the core network for the attention of said end device. If the buffer does not contain such useful data, the gathering gateway 128 constructs a downlink frame including the aforementioned acknowledgement and transmits the downlink frame thus constructed to said end device at an opportune moment. Otherwise the gathering gateway 128 constructs a downlink frame including the aforementioned acknowledgement and also including data stored in the buffer. These data are then deleted from the buffer, and the gathering gateway 128 transmits the downlink frame thus constructed to said end device at an opportune moment, and step 1205 is next performed.

In the particular embodiment where the communications with the end device in question are encrypted, the gathering gateway 128 authenticates the end device by decoding an integrity code included in the uplink frame received at step 1201 by means of the security keys associated with said end device. This integrity code is called MIC (message integrity code) in the LoRaWAN 1.1 specifications. If the authentication fails, the gathering gateway 128 discards the uplink frame and interrupts the execution of the algorithm in FIG. 12. In addition, when the gathering gateway 128 must encrypt the downlink frame constructed, the gathering gateway 128 uses the security keys associated with said roaming end device in order to encrypt said downlink frame, before transmitting said downlink frame in encrypted form. The downlink frame in encrypted form also includes an integrity code authenticating the core network on behalf of which the gathering gateway 128 is acting.

In step 1205, the gathering gateway 128 tracks to the core network the uplink frame or the data contained in the uplink frame, so that said uplink frame can arrive at the fourth server AS 150 in order to process the content thereof. The gathering gateway 128 can also solely relay the data without delegation. Data without delegation means the data that do not relate to a functionality delegated to the gathering gateway 128. The gathering gateway 128 can thus for example not propagate the integrity code contained in the uplink frame received from said roaming end device. These data may be encrypted by the gathering gateway 128 by means of a security key also known to the first server FNS 132, for example using a secure tunnel.

It should be noted, in the light of the algorithm in FIG. 12, that the data contained in an uplink frame may be relayed by a plurality of gathering gateways that would capture the uplink frame in question. It is then the responsibility of the first server FNS 132 to effect any appropriate deduplication of data.

Figure 13:
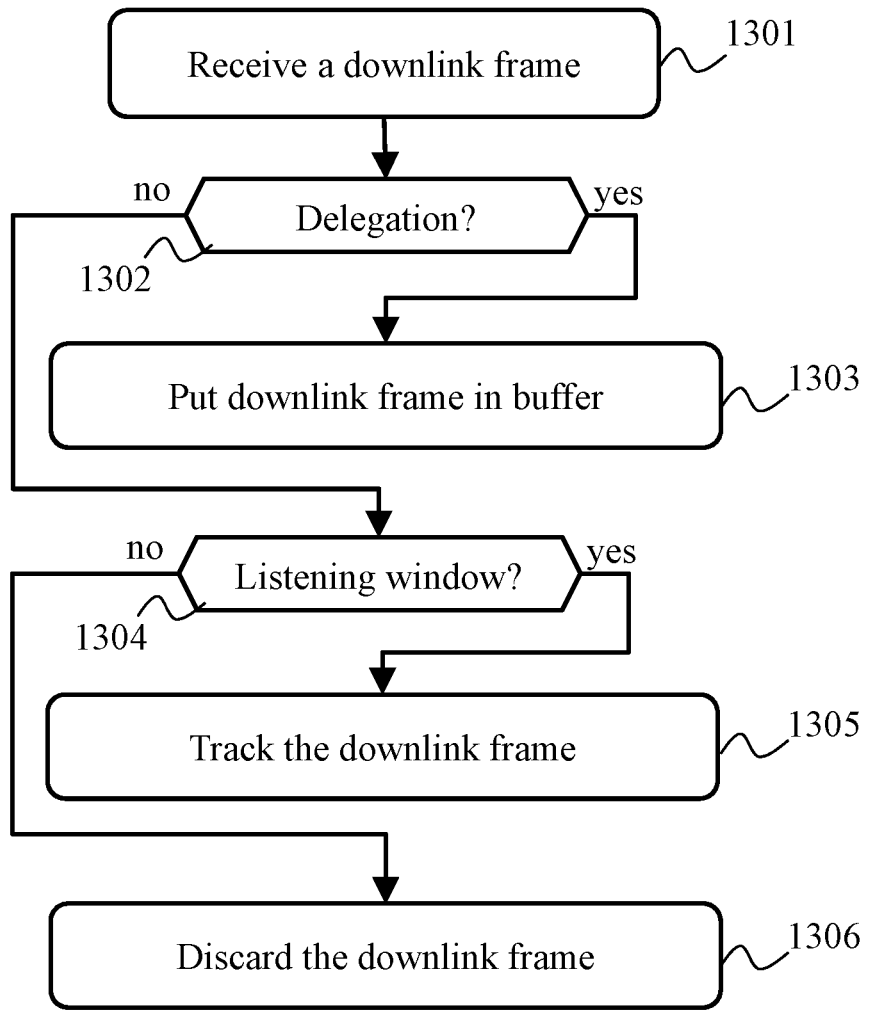
FIG. 13 illustrates schematically a downlink-frame processing algorithm.

FIG. 13 illustrates schematically a downlink-frame processing algorithm. The algorithm in FIG. 13 is implemented by each gathering gateway of the first network. We shall consider by way of illustration that the algorithm in FIG. 13 is implemented by the gathering gateway 128.

In a step 1301, the gathering gateway 128 receives a downlink frame coming from the core network. The downlink frame specifies the address of the end device for which said downlink frame is intended.

In a step 1302, the gathering gateway 128 checks whether the delegation has been activated vis-à-vis said end device (in which case the end device in question is roaming) or not. If such is the case, a step 1303 is performed; otherwise a step 1304 is performed.

In step 1303, the gathering gateway 128 puts the data contained in the downlink frame received at step 1301 in the buffer associated with the roaming end device for which said data are intended. Then "useful data" can be spoken of, for the attention of said roaming end device. The downlink frame received at step 1301 then typically has a format different from the downlink frames transmitted by the first server FNS 132 when the delegation mechanism is not activated, since at least the acknowledgements are not managed by the core network when the delegation mechanism is activated. The gathering gateway 128 will subsequently send the useful data thus received from the core network for the attention of the end device in question, when a reception window will enable it to, and more particularly in response to a future uplink transmission on the part of said roaming end device.

In step 1204, the gathering gateway 128 must provide the relaying of the downlink frame received at step 1201. Given that the delegation is not activated, the gathering gateway 128 can make the relay to the end device in question only if there remains at least one reception window to come according to the uplink frame that triggered the sending of said downlink frame by the core network. In other words, the gathering gateway 128 checks whether said gathering gateway 128 had kept track of the fact that feedback was expected from the core network vis-à-vis an uplink frame previously received from said end device. If such is the case, a step 1205 is performed; otherwise a step 1206 is performed.

In step 1205, the gathering gateway 128 tracks the downlink frame received at step 1201 in a said reception window defined according to an instant of transmission of the uplink frame that triggered the sending of said downlink frame by the core network.

In step 1206, the gathering gateway 128 is out of time for being able to relay the downlink frame to the end device in question. The gathering gateway 128 therefore discards the downlink frame. It is then the responsibility of the core network to subsequently retransmit the useful data that were contained in said downlink frame.

It can also be seen from the above that transferring some of the control functionalities of the MAC layer from the server SNS 134 to the gathering gateways of the first network constitutes a significant improvement in terms of latency in situations of handover roaming in a context where separate transport protocols are used for forming the LPWAN communication network via which the handover roaming is activated.

It can also be seen from the above that, although it is not necessary to implement the message formats defined in the LoRaWAN protocol in order to benefit from the advantages of the invention, the devices and methods described are broadly compatible with the LoRaWAN 1.1 specifications and constitute a significant improvement thereto in terms of latency.

The invention claimed is:

1. A method for the management of handover roaming in a communication system comprising a first LPWAN network of a first operator and a second LPWAN network of a second operator, the first network comprising:
   subnetworks each comprising at least one convergence node and communication nodes integrating gathering gateways, the subnetworks implementing separate respective transport protocols,
   a first server, for each subnetwork, responsible for managing said gathering gateways included in said subnetwork, each gathering gateway communicating via a single convergence node associated with an associated single first server, and a second server, coupled to any first server, responsible for controlling the MAC layer for end devices communicating via said gathering gateways of the first network;

the second network comprising:

a third server responsible for interfacing a fourth server and a fifth server with the second server of the first network, the fourth server, which implements an application with which at least one end device of the second operator exchanges application data in the context of a subscription to services defined with the second operator, and the fifth server, responsible for authenticating any end device seeking to join the communication system in order to benefit from the services of the fourth server;

the method being such that the communication system transports uplink frames including application data from said at least one end device of the second operator to the fourth server by successive relayings of a said first server, of the second server and of the third server when said at least one end device of the second operator is authenticated and furthermore such that said uplink frames are captured by at least one gathering gateway of the first network, the method being furthermore such that each gathering gateway of at least one subnetwork of the first network, which has detected an end device of the second operator requesting to join the communication system in order to benefit from the services of the fourth server communicates with the fifth server in order to authenticate said end device of the second operator detected, shortcutting the first server associated with said gathering gateway, the second server and the third server by means of a communication interface also shortcutting the convergence node associated with said gathering gateway.

2. The method according to claim 1, wherein the first network having a range of addresses for all the end devices accessing the communication system via the gathering gateways of the first network, the fifth server manages a predetermined subset of addresses in the range of addresses of the first network and attributes one address among said predetermined subset of addresses to any end device of the second operator that is in handover roaming via the first network and is authenticated by the fifth server.

3. The method according to claim 1, wherein the communications with each authenticated end device of the second operator being encrypted, the fifth server provides the security keys necessary for said encrypted communications, and, when a gathering gateway of the first network receives a message from the fifth server indicating that an end device of the second operator has been authenticated successfully and including said security keys, said gathering gateway of the first network relays the security keys to the first server associated with said gathering gateway.

4. The method according to claim 3, wherein the first server relay the security keys to the second server.

5. The method according to claim 1, wherein in order to request to join the communication system in order to benefit from the services of the fourth server, each end device of the second operator sends a message including an identifier that uniquely identifies the fifth server, and in that each gathering gateway of the first network capturing said message determines at what address to contact the fifth server by means of an association previously stored in memory between said identifier and the address for contacting the fifth server.

6. The method according to claim 5, wherein on configuration of each gathering gateway of the first network with the identifier that uniquely identifies the fifth server, said gathering gateway of the first network requests a sixth server, responsible for making resolutions of domain names, to supply the address for contacting the fifth server by means of said identifier that uniquely identifies the fifth server.

7. The method according to claim 6, wherein on configuration of each first server with the identifier that uniquely identifies the fifth server, each first server requests a sixth server, responsible for making resolutions of domain names, to supply the address for contacting the fifth server by means of said identifier that uniquely identifies the fifth server, and each first server propagates an association of said identifier and said address to each gathering gateway that is associated with said first server.

8. The method according to claim 1, wherein when the fifth server receives a plurality of copies of the same message that emanates from an end device of the second operator and which requests to join the communication system, the fifth server effects a deduplication of data and responds to the first copy in sequence of said message.

9. The method according to claim 1, wherein when a gathering gateway of the first network receives a message from the fifth server indicating that an end device of the second operator has been successfully authenticated, said gathering gateway activates a delegation and notifies accordingly the first server with which said gathering gateway is associated, the delegation comprising the following steps:

allocating a buffer to said end device of the second operator and storing therein useful data subsequently received asynchronously via said first server for the attention of said end device of the second operator; and acknowledging any uplink frame subsequently received from said end device of the second operator while constructing and transmitting, on behalf of the second server, downlink frames including respective acknowledgements of said uplink frames and including, where applicable, useful data stored in the buffer allocated to said end device of the second operator; and relaying the uplink frame to said first server, and, on reception of a downlink frame for the attention of said end device of the second operator:

placing the useful data, supplied in the downlink frame, in the buffer allocated to said end device of the second operator.

10. The method according to claim 9, wherein each gathering gateway of the first network that receives, coming from the first server associated with said gathering gateway, an instruction to deactivate the delegation vis-a-vis an end device of the second operator, performs the following steps:

if the buffer allocated to said end device of the second operator is empty, confirming with said first server that said gathering gateway has deactivated the delegation vis-à-vis said end device of the second operator;

if the buffer allocated to said end device of the second operator is not empty, maintaining the delegation until the buffer is emptied by construction and transmission of said downlink frames by said gathering gateway.

11. The method according to claim 9, wherein each gathering gateway of the first network that has activated the delegation vis-à-vis an end device of the second operator increments a value of a counter of downlink frames as said downlink frames are constructed for the attention of said end device of the second operator and includes in said downlink frames the incremented value of the downlink frame counter, and, when said gathering gateway deactivates the delegation, said gathering gateway notifies to the first server with which said gathering gateway is associated an up-to-date value of the downlink frame counter.

12. The method according to claim 1, wherein a subnetwork of the first network is a powerline communication network wherein said communication nodes are smart electricity meters and wherein each convergence device is a data concentrator, and another subnetwork of the first network is a network providing access to the internet wherein said communication nodes are residential gateways and wherein each convergence device is a multiplexer of the DSLAM type.

13. A communication system comprising a first LPWAN network of a first operator and a second LPWAN network of a second operator, the first network comprising:
   subnetworks each comprising at least one convergence node and communication nodes integrating gathering gateways, the subnetworks implementing separate respective transport protocols,
   a first server, for each subnetwork, responsible for managing said gathering gateways, included in said subnetwork, each gathering gateway communicating via a single convergence node associated with an associated single first server, and
   a second server, coupled to any first server, responsible for controlling the MAC layer for end devices communicating via said gathering gateways of the first network;
the second network comprising:
   a third server responsible for interfacing a fourth server and a fifth server with the second server of the first network,
   the fourth server, which implements an application with which at least one end device of the second operator exchanges application data in the context of a subscription to services defined with the second operator, and
   the fifth server, responsible for authenticating any end device seeking to join the communication system in order to benefit from the services of the fourth server;
   the communication system being arranged, in the context of a management of handover roaming between the first network and the second network, for transporting uplink frames including application data from said at least one end device of the second operator to the fourth server by successive relayings of a said first server, of the second server and of the third server when said at least one end device of the second operator is authenticated and furthermore when said uplink frames are captured by at least one gathering gateway of the first network,
   the communication system furthermore being such that each gathering gateway of at least one subnetwork of the first network, which has detected an end device of the second operator requesting to join the communication system in order to benefit from the services of the fourth server, communicates with the fifth server in order to authenticate said end device of the second operator detected, shortcutting the first server associated with said gathering gateway, the second server and the third server by means of a communication interface also shortcutting the convergence node associated with said gathering gateway.

14. The communication system according to claim 13, wherein a subnetwork of the first network is a powerline communication network wherein said communication nodes are smart electricity meters and wherein each convergence device is a data concentrator, and another subnetwork of the first network is a network providing access to the internet wherein said communication nodes are residential gateways and wherein each convergence device is a DSLAM multiplexer.

* * * * *